US008873453B2

(12) United States Patent
Manapragada et al.

(10) Patent No.: US 8,873,453 B2
(45) Date of Patent: Oct. 28, 2014

(54) METHOD AND APPARATUS FOR WIRELESS TRANSMISSION OF HIGH DATA RATE STREAMS

(75) Inventors: Sai C. Manapragada, San Jose, CA (US); Alvin Dale Kluesing, San Jose, CA (US)

(73) Assignee: Sigma Group, Inc., Morganville, NJ (US)

( * ) Notice: Subject to any disclaimer, the term of this patent is extended or adjusted under 35 U.S.C. 154(b) by 0 days.

(21) Appl. No.: 12/152,638

(22) Filed: May 14, 2008

(65) Prior Publication Data

US 2009/0074051 A1 Mar. 19, 2009

Related U.S. Application Data

(60) Provisional application No. 60/930,051, filed on May 14, 2007, provisional application No. 60/933,901, filed on Jun. 11, 2007, provisional application No. 60/933,904, filed on Jun. 11, 2007, provisional application No. 60/933,905, filed on Jun. 11, 2007.

(51) Int. Cl.
*H04B 7/14* (2006.01)
*H04J 1/00* (2006.01)
*H04L 29/06* (2006.01)

(52) U.S. Cl.
CPC .................................. *H04L 65/607* (2013.01)
USPC ........................... 370/315; 370/343; 370/401

(58) Field of Classification Search
None
See application file for complete search history.

(56) References Cited

U.S. PATENT DOCUMENTS

| | | | |
|---|---|---|---|
| 5,646,946 A * | 7/1997 | VanderMeer et al. | 370/442 |
| 5,771,229 A | 6/1998 | Gavrilovich | |
| 6,154,637 A | 11/2000 | Wright et al. | |
| 6,198,749 B1 | 3/2001 | Hui et al. | |
| 6,405,261 B1 * | 6/2002 | Gaucher | 709/250 |
| 6,496,477 B1 | 12/2002 | Perkins et al. | |
| 6,647,015 B2 | 11/2003 | Malkemes et al. | |
| 6,744,789 B1 * | 6/2004 | Michener | 370/509 |
| 6,775,235 B2 | 8/2004 | Datta et al. | |
| 6,775,305 B1 | 8/2004 | Delvaux | |
| 6,868,093 B1 * | 3/2005 | Bohm et al. | 370/506 |
| 7,003,062 B1 | 2/2006 | Leyn | |
| 7,013,087 B2 * | 3/2006 | Suzuki et al. | 370/310 |
| 7,133,354 B2 * | 11/2006 | Laroia et al. | 370/343 |
| 7,206,811 B2 * | 4/2007 | Skurikhin et al. | 370/412 |
| 7,269,143 B2 | 9/2007 | Datta et al. | |
| 7,286,476 B2 | 10/2007 | Helmy et al. | |
| 7,423,992 B2 * | 9/2008 | Iwamura | 370/330 |

(Continued)

FOREIGN PATENT DOCUMENTS

| | | |
|---|---|---|
| JP | 2002/027018 A | 1/2002 |
| KR | 04/0076710 A | 9/2004 |
| WO | 2008038261 A2 | 4/2008 |
| WO | PCT/US2008/066512 | 10/2008 |

*Primary Examiner* — Gregory Sefcheck
*Assistant Examiner* — Joshua Smith
(74) *Attorney, Agent, or Firm* — Robert O. Groover, III; Gwendolyn S. S. Groover; Groover & Associates PLLC

(57) ABSTRACT

Methods, system and devices for wireless transmission of HDMI data streams. Plurality of data multiplex converters are constructed and used in parallel to process one HDMI datastream into plurality of channels of data packets wherein the plurality of channels of data packets are transmitted through Wi-Fi wireless protocols to a destination device. The received plurality of channels of data packets are reassembled into one data stream for display or play.

16 Claims, 27 Drawing Sheets

(56) References Cited

U.S. PATENT DOCUMENTS

| | | | |
|---|---|---|---|
| 7,529,190 B2 | 5/2009 | Van Oldenborgh et al. | |
| 2001/0012338 A1* | 8/2001 | Frank et al. | 370/445 |
| 2002/0051468 A1* | 5/2002 | Ofek et al. | 370/503 |
| 2002/0087724 A1 | 7/2002 | Datta et al. | |
| 2002/0107968 A1 | 8/2002 | Horn et al. | |
| 2002/0136168 A1* | 9/2002 | Struhsaker et al. | 370/277 |
| 2003/0172179 A1 | 9/2003 | Del Prado Pavon et al. | |
| 2004/0008661 A1 | 1/2004 | Myles et al. | |
| 2004/0042506 A1* | 3/2004 | Fallon et al. | 370/521 |
| 2004/0257978 A1* | 12/2004 | Shao et al. | 370/208 |
| 2005/0259613 A1 | 11/2005 | Garudadri et al. | |
| 2005/0259754 A1 | 11/2005 | Ho et al. | |
| 2005/0286466 A1* | 12/2005 | Tagg et al. | 370/329 |
| 2006/0067297 A1 | 3/2006 | Chaar et al. | |
| 2007/0053295 A1* | 3/2007 | Cleveland et al. | 370/235 |
| 2008/0056192 A1* | 3/2008 | Strong et al. | 370/331 |
| 2008/0144560 A1* | 6/2008 | Jia et al. | 370/312 |

\* cited by examiner

|  | Compressed Video | |
|---|---|---|
|  | Yes | no |
| Encrypted Video yes | Case 1 | Case 3 |
| no | Case 2 | Case 4 |

FIG. 2

Uncompressed and Encrypted Input

Uncompressed and Unencrypted Input

Compressed and Encrypted/Unencrypted Input

METHOD AND APPARATUS FOR WIRELESS TRANSMISSION OF HIGH DATA RATE STREAMS

CROSS-REFERENCE TO OTHER APPLICATION

Priority is claimed from U.S. Provisional Application 60/930,051 filed on May 14, 2007, and U.S. Provisional Application 60/933,901 filed on Jun. 11, 2007, and U.S. Provisional Application 60/933,904 filed Jun. 11, 2007 and U.S. Provisional Application 60/933,905 filed Jun. 11, 2007, all of which are hereby incorporated by reference. This application may be related to the present application, or may merely have some drawings and/or disclosure in common.

BACKGROUND

The present application relates to multi-media networks, and more particularly to establishing an IP based, Wi-Fi like, high range wireless network of high bandwidth multi-media distribution. The content of the distribution includes, but not limited to, high-definition video, digital sound, satellite TV, cable TV, high speed data, games, etc.

Note that the points discussed below may reflect the hindsight gained from the disclosed inventions, and are not necessarily admitted to be prior art.

With the proliferation of high quality video, an increasing number of electronic devices, such as consumer electronic devices, utilize high definition (HD) video which can require multi-Gbps (bits per second) in bandwidth for transmission. The High-Definition Multimedia Interface (HDMI) specification allows transfer of uncompressed HD signals between devices via a cable. While consumer electronics makers are beginning to offer HDMI-compatible equipment, there is not yet a suitable wireless (e.g., radio frequency) technology that is capable of transmitting uncompressed HD video signals.

The introduction of consumer friendly Wi-Fi technology has let home and office users create wireless local networks and connect two or more computers wirelessly to each other and a faster Internet line. This way there is no more poking holes in walls or tripping over Ethernet cables. People can access the internet anywhere in home and in office. The Wi-Fi technology is rapidly gaining acceptance as an alternative to a wired local area network (LAN).

A Wi-Fi enabled device such as a PC, game console, cell phone, MP3 player or a PGA can connect to the internet when within range of a wireless network that is connected to the Internet. The area covered by a Wi-Fi hotspot (Access Point) can be as little as a single room with wireless-opaque walls or as much as many square miles covered by overlapping access points.

Routers which incorporate a DSL or cable modem and a Wi-Fi access point are often used in homes and other premises, and provide Internet access and inter-networking to all devices connected via wireless or by cable into them. Devices supporting Wi-Fi can also be connected in ad-hoc mode for client-to-client connections without a router.

Wi-Fi devices use unlicensed spectrum to provide access to a network, ameliorating the trouble of obtaining FCC license.

In short, Wi-Fi allows LANs to be deployed without cabling for client devices, dramatically reducing the costs of network deployment and expansion. Spaces where cables cannot be run, such as outdoor areas and historical buildings, can host wireless LANs.

However, current Wi-Fi technology has significant operational limitations as well as severe shortcomings in spectrum assignments.

A current typical Wi-Fi adapter operates at a maximum raw data rate of 54 Mbit/s, and suffers sometimes severe channel interferences and collisions.

Wi-Fi technology has introduced a Quality of Service (QoS) and Class of Service (CoS) mechanism similar to fixed Ethernet, where packets can receive different priorities based on their tags. This means that QoS is relative between packets/flows, as opposed to guaranteed.

The operational limitations of Wi-Fi have limited its applications mainly to the Internet, but real multi-media distribution network requires much higher bandwidth with better, more manageable and consistent QoS mechanism.

Given that the current high definition multimedia are transmitted as 1-10 Gbit/s, the current Wi-Fi system, with 54 Mbit/s capacity, is powerless to transmit high definition video, audio and other multimedia. Although current Ultra Wide Band technology can offer up to 5 Gbit/s, its range usually is within 10 meters, and often is Line of Sight.

In most wireless communications, HD video is compressed first before transmitting to the wireless medium. Compression of the HD video is attractive because the overall required communication bandwidth and power can be significantly reduced, relative to transmission of the original, uncompressed video. However, with each compression and subsequent decompression of the video, some video information can be lost and the picture quality is degraded.

SUMMARY

The present application discloses new approaches, systems and devices for wireless transmission of high data rate streams, with particular usage in transmission of high definition video and audio data streams, and large application data streams.

In one embodiment, the Picon multi-streaming system contains a data multiplexing converter that splits a single datastream into plurality of channels.

In another embodiment, the Picon multi-streaming system contains plurality of data multiplexing converters which process a single data stream in parallel, thereby producing plurality of channels of data packets.

In another embodiment, the Picon multi-streaming system contains a plurality of processing units which process plurality of channels of data packets in parallel.

In one embodiment, one channel of data packets has a clock rate that is different to that of another transmitting channel, and either of the clock rates may be less than the clock rate of the input stream In one embodiment, data packets from one channel have different packet size than that of data packets from another channel, generating a lower data rate than that of the input data stream.

In one embodiment, the data packets comply with IP and IP secure protocols. The data multiplexing converter implements the specifications of 802.11n.

The system also contains a wirelessly transmitted clock reference for data synchronization.

The wirelessly transmitted data packets are received at a Picon wireless multimedia adapter via multichannel radio frequency receiver or receivers.

In one embodiment, the adapter includes a processing unit or plurality of parallel processing units that de-formats the received data packets and extracts information from individual data packets and prioritizes and schedules for next processing.

In one embodiment, the adapter includes a multiplex unit or plurality of multiplex units operating in parallel to congregate substreams of data packets back into single data stream for display.

In one embodiment, these multiple channel systems are configured as such wherein a higher data rate signal is transmitted using multiple lower data rate channels by utilizing the multi-streaming technique shown herein with where higher data rate streams are dispersed into multiple lower data rate streams and transmitted through multiple lower data rate channels simultaneously such that either a higher data rate channel or a multitude of lower data rate channels receive the said transmitted streams and concatenate the multiple lower data rate streams into a single higher data rate stream.

The disclosed innovations, in various embodiments, provide one or more of at least the following advantages:

- The use of multiple antennas both at the transmitter and receiver to improve the performance of radio communication systems.
- It offers significant increases in data throughput and link range without additional bandwidth or transmit power.
- It achieves higher spectral efficiency (more bits per second per Hertz of bandwidth) and link reliability or diversity with reduced fading.
- Prevents signal loss and also can recover data losses in case of error and interferences.
- Enable people to high quality wireless video, digital audio and high speed data seamlessly and securely throughout the home and office across multiple rooms;
- Enables multiple sources of media to multiple display units, thus while a laptop is receiving a DVD data stream, the DVD video can also be transmitted and played on a TV simultaneously.
- Offers a portable multimedia server which can seamlessly integrate into the existing networks and systems.

BRIEF DESCRIPTION OF THE DRAWINGS

The disclosed inventions will be described with reference to the accompanying drawings, which show important sample embodiments of the invention and which are incorporated in the specification hereof by reference, wherein:

FIG. 2 shows four cases of different video data types.

DETAILED DESCRIPTION OF SAMPLE EMBODIMENTS

The numerous innovative teachings of the present application will be described with particular reference to presently preferred embodiments (by way of example, and not of limitation).

High Definition (HD) signals are typically transmitted from one system to another using cables carrying DVI (Digital Video Interface) or HDMI (High Definition Multimedia Interface) signals. Conventionally, DVI/HDMI signals are conveyed using a signaling scheme known as Transition Minimized Differential Signaling (TMDS). In TMDS, video, audio, and control data are carried as a series of 24-bit words on three TMDS data channels with a separate TMDS channel for carrying clock information. Additionally, DVI/HDMI systems may include a separate bi-directional channel known as the Display Data Channel (DDC) for exchanging configuration and status information between a source and a sink, including information needed in support of High-Bandwidth Digital Content Protection (HDCP) encryption and decryption. In HDMI, an optional Consumer Electronic Control (CEC) protocol provides high-level control functions between audiovisual products.

The Picon home network disclosed in this application is a wireless network comprising Picon Media Server and Picon Receiver that can seamlessly and securely integrate into the conventional audio-video cable system and provides about 10× improvement in data throughput over standard Wi-Fi technology, thus enables consumers to stream high quality wireless video, digital audio and high speed data applications across multiple rooms in home and in office without the stress of cabling. Also it provides an architecture to wirelessly transmit clock channels and information for encryption and decryption and other configurations.

A Picon system is compatible with existing wireless technology and High Definition Multimedia Interface (HDMI), IEEE 802.11, Multiple-in Multiple out (MIMO), standard Wi-Fi physical (PHY) and Media Access Control (MAC) layer, and existing IP protocols, extremely high bandwidth applications such as Voice IP (VOIP), streaming audio and video content (including high definition), multicast applications, and also supports convergent networks, and ad hoc networks.

On transmission, video, audio, and related information data signals are digitally encoded into a packetized data stream using a number of algorithms, including error protection and correction. A micro-controller may be included to control the overall operation, including selection of parameters, the set-up and control of components, channel selection, viewer access to different programming packages, blocking certain channels, packet loss prevention and other functions. The compression and de-compression of packetized data streams may be accomplished according to the Motion Picture Expert Group (MPEG) various standards and HDMI standards and specifications.

The Picon System Architecture

Figure 1:
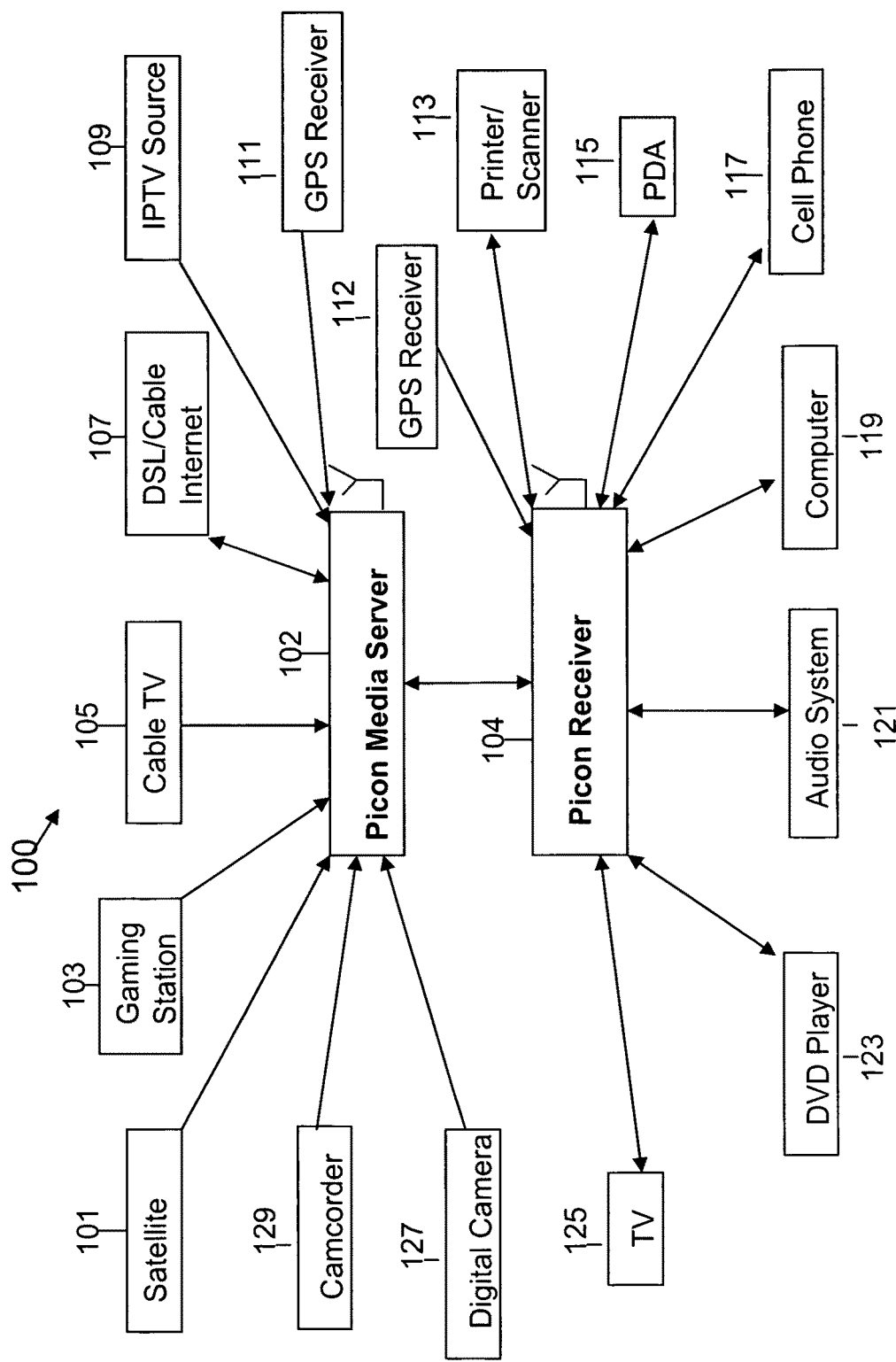
FIG. 1 schematically shows an example of Picon macronetwork.

FIG. 1 is a network diagram illustrating an example wireless communication network 100 according to an embodiment of the present disclosure. In the illustrated embodiment, the wireless network 100 comprises a plurality of devices including device 111, 113, 115, 117, 119, 121, 123, 125, 127, 129 etc. Each of the devices can be any of a variety of multimedia and/or wireless devices, including a DVD player, digital audio systems, analog or digital TV, camcorder, digital camera, printer, scanner, fax machine, copy machine, graphics processor, cell phone, personal digital assistant ("PDA"), personal computer ("PC"), laptop computer, PC card, special purpose equipment, access point, router, switch, base station controller, game machine, WiFi phone, security camera, set top box, GPS, or any combination of these and other devices configured to process and handle large amount of data.

With the aid of the Picon system, as shown in this embodiment, including Picon media server 102 and receiver 104, these media display devices, regardless of whether they were originally capable of wireless communication, will gain the capacity to communicate to other devices in the network wirelessly. These devices become not only the data receivers, but also data providers, when the communication is configured to be bi-directional. Other data sources can, as indicated by such as 101, 103, 105, 107, 109, be for any of a variety of cable TV, satellite system, gaming stations, broadband Internet, IPTVs etc., provided by outside service providers, including audio, video data, or application data or the combination thereof. Depending on the service providers, the communication with these data sources can be configured to be either uni-directional or bi-directional, that any of the above mentioned devices can send data to those service systems through the Picon media server/receiver wirelessly. The communication between the Picon media server and receiver may be configured to be bi-directional as well.

High rate digital data come into the network through wire or satellite dish, via conventional connections such as satellite set-top box 101, gaming stations 103, cable TV set-top box 105, DSL modem 107, IPTV set-top box 109 etc. The high rate digital data are transmitted to Picon Media Server 102 through wire for data processing into lower rate digital data stream. Processed data are then wirelessly transmitted to Picon Receiver 104 which is connected with individual display devices, such as, devices 111, 113, 115, 117, 119, 121, 123, 125, 127, 129. Picon Receiver 104, upon receiving the wirelessly transmitted lower rate data stream, recovers and restores the lower rate data streams into the original high rate data stream and then sends them to the respective corresponding play or display device. The wireless transmission may be based on Wi-Fi protocol (IEEE 802.11 or other protocol transmission protocols, such as 3G Code Division Multiple Access (CDMA) technologies, using IP or IP secure protocols.

In the illustrated embodiment, the network 100 could be any of a variety of network types and topologies and employ any of a variety of types of protocols. For the sake of providing a straightforward description, the illustrated embodiment will be described as an IEEE 802.11 compliant.

In one embodiment, the high data rate content streams from one or more data sources can be either encrypted or not encrypted, compressed or uncompressed. For example, in FIG. 2, Case 1 is a both encrypted and compressed video stream; Case 2 is a compressed, but not encrypted video stream; Case 3 is an uncompressed but encrypted video stream; Case 4 is a neither compressed nor encrypted video signal. Case 4 can be either an analog data stream or a digital data stream, while Cases 1-3 are digital data streams.

Figure 3:
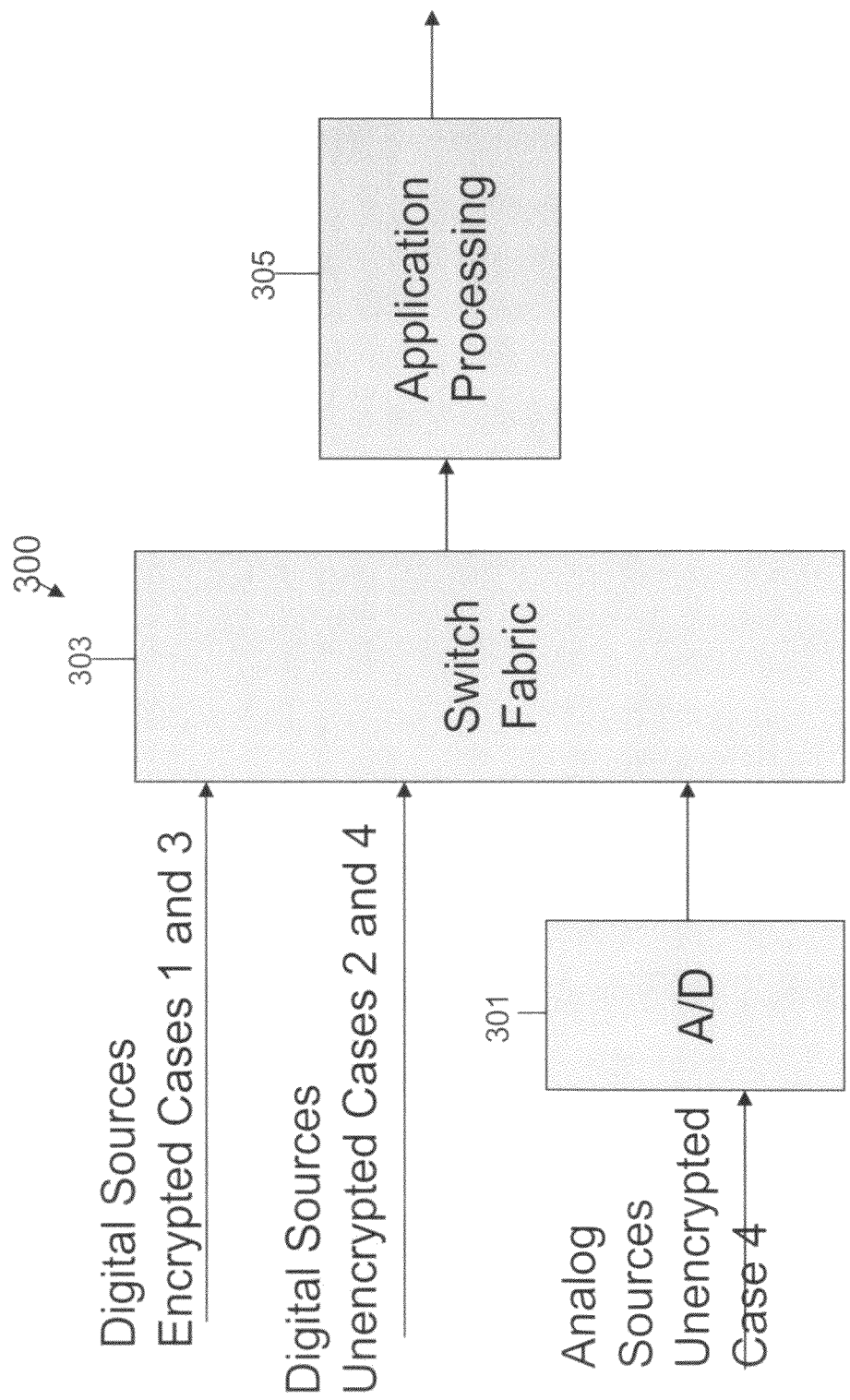
FIG. 3 shows an example of the processing flow for data types in FIG. 2.

Before directly passing the data stream for processing, the Picon media server 102 can include other switches and routers to direct the input data steams to the correct processing port. In one embodiment, as shown in FIG. 3, the digital data of Case 1-4 can go through a Switch Fabric 303 which dynamically directs each data case in accordance with specifications of various versions of IP protocols to the correct port of the processing engine 305. If Case 4 is an analog signal, Case 4 is first directed to an analog/digital converter 301 before being directed to Switch Fabric 303. The switch fabric 303 can also enable other servers and storage devices to communicate with each other. It may also provide for a failover architecture in the event that a server or disk array ceases to operate. The switches can manage the state of the fabric, providing optimized interconnections.

Figure 4:
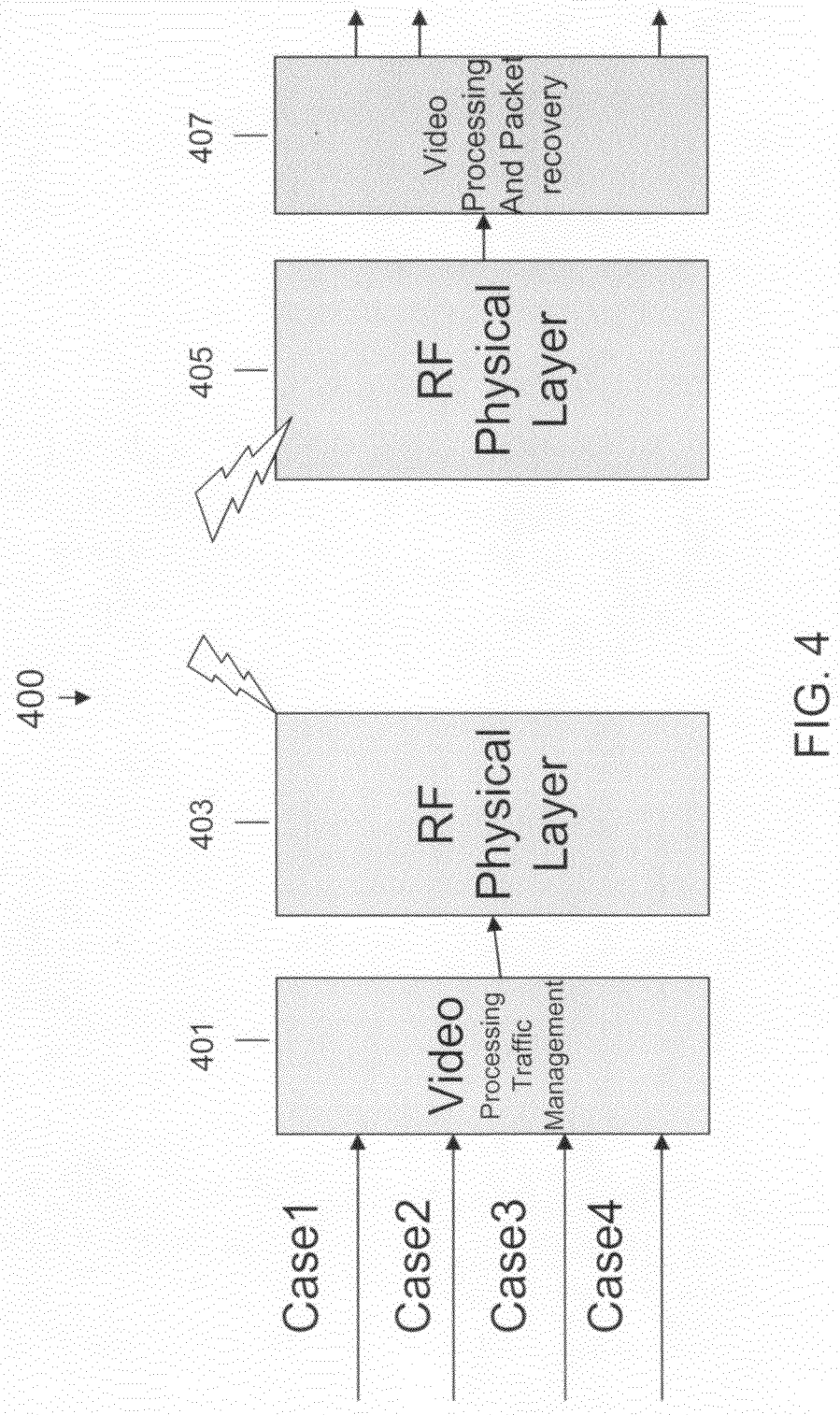
FIG. 4 shows one example of the general functional structure of a Picon system.

In one embodiment, as shown in FIG. 4, the Picon media server includes a data processing traffic management layer (Transmitter Application Layer) 401 and a physical layer 403 (PHY); the Picon receiver includes a physical layer 405 (PHY) and data processing and packet recovery layer (Receiver Application Layer) 407. The PHY layers provide wireless communication between the media server 102 and the receiver 104 via one or more antennas through a wireless medium.

In between the data processing layer and the PHY layer, a data link layer Picon Air Interface (PAInt) may be included that acts an interface between the data processing layer and the PHY layer, which can be implemented in accordance with the Layer 3 of IP or MAC as specified in OSI seven layer model, to provide an addressing mechanism for identifying the physical address of the destinations of the data streams. The physical address may be a unique serial number or an IP address assigned to each of the node devices on the network that makes it possible to deliver data packets to a destination within the network.

The PHY layer communicates with the MAC layer and with a radio frequency (RF) module. In certain embodiments, the MAC layer can include a packetization module (not shown). The PHY/MAC layers of the transmitter in the Picon media server add PHY and MAC headers to packets and transmit the packets to the Picon receiver over one or multiple wireless channels.

Figure 9:
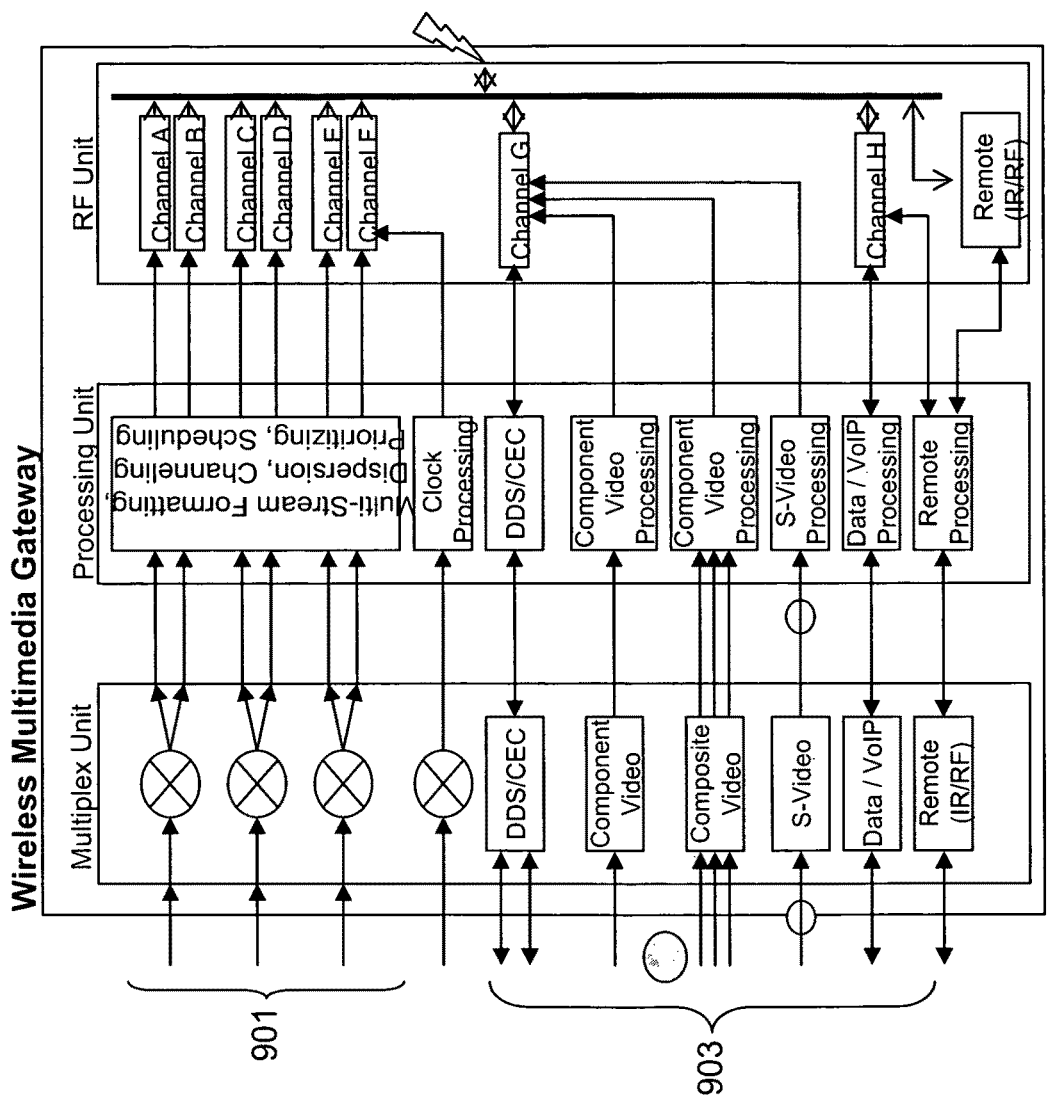
FIG. 9 depicts an example architecture of a Picon wireless multimedia gateway.

The PHY layer of a Picon transmitter includes one or more Wireless Multimedia Gateways (FIG. 9) that comprises both multi-streaming and multi-channelling mechanism. Multi-streaming mechanism comprises plurality of parallel Wi-Fi like multiplexing units which splits a single datastream into plurality of low rate (LR) bitstreams and distributes them among plurality of channels. The splitting of the original high rate data stream 901, for example of a high definition video stream, can be implemented using the Multiple-input and multiple-output (MIMO) technology as specified in IEEE 802.11n. For multi-channeling mechanism (903), each data type is processed by data-type specific processing unit, such as processing unit for DDC/CEC processing, composite video processing, component video processing, S-video processing, data/VoIP processing, etc, see in FIG. 9; and each of the sub-streams can be further processed in parallel in a processing unit that formats the sub-streams into packets with header information for the receiver(s) and be transmitted through one or more antennas in parallel. The number of antennas and the use of a specific antenna may be dynamically controlled by a controlling module that disperses, prioritizes, and schedules the transmission of each sub-stream.

Figure 10:
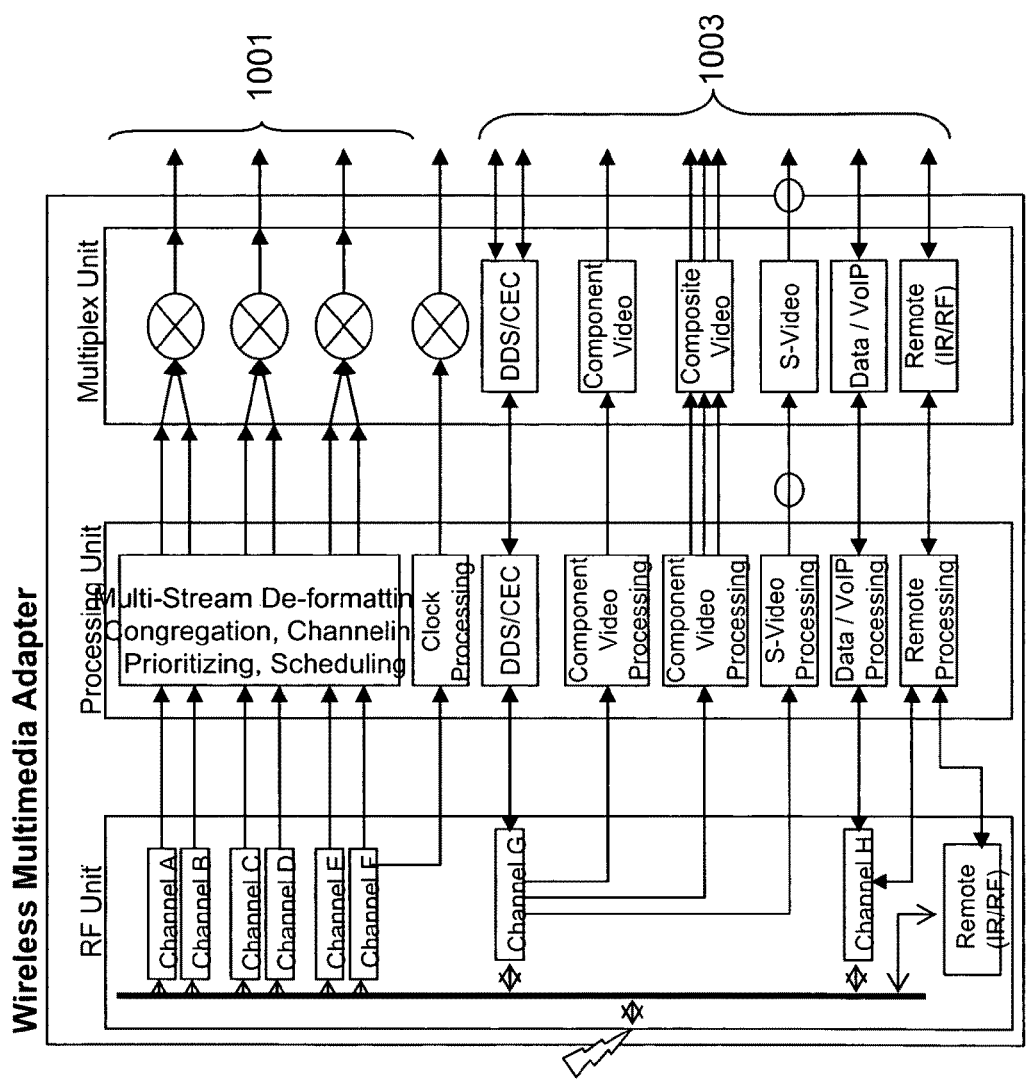
FIG. 10 depicts an example architecture of a Picon wireless multimedia adapter.

The PHY layer of a Picon receiver includes one or more Wireless Multimedia Adapters (FIG. 10) that comprises multiple parallel Wi-Fi adapter-like units 1001 which can further have more than two low-rate receiving channels, each of which are linked to one or multiple antennas to receive data packets originally transmitted from HDMI source or other high data rate sources, and receiving channels for ordinarily compressed data. Each of the received sub-streams of packets is further processed in a processing unit that de-formats the packets and checks for errors based on the header information. Such sub-streams of packets, depending the required criteria, may be further congregated in a multiplex converter to be outputted at high data rate (1001), or can be outputted to the sink at a modified or a similar or the same data rate (1003) as that of the original data streams.

Figure 5:
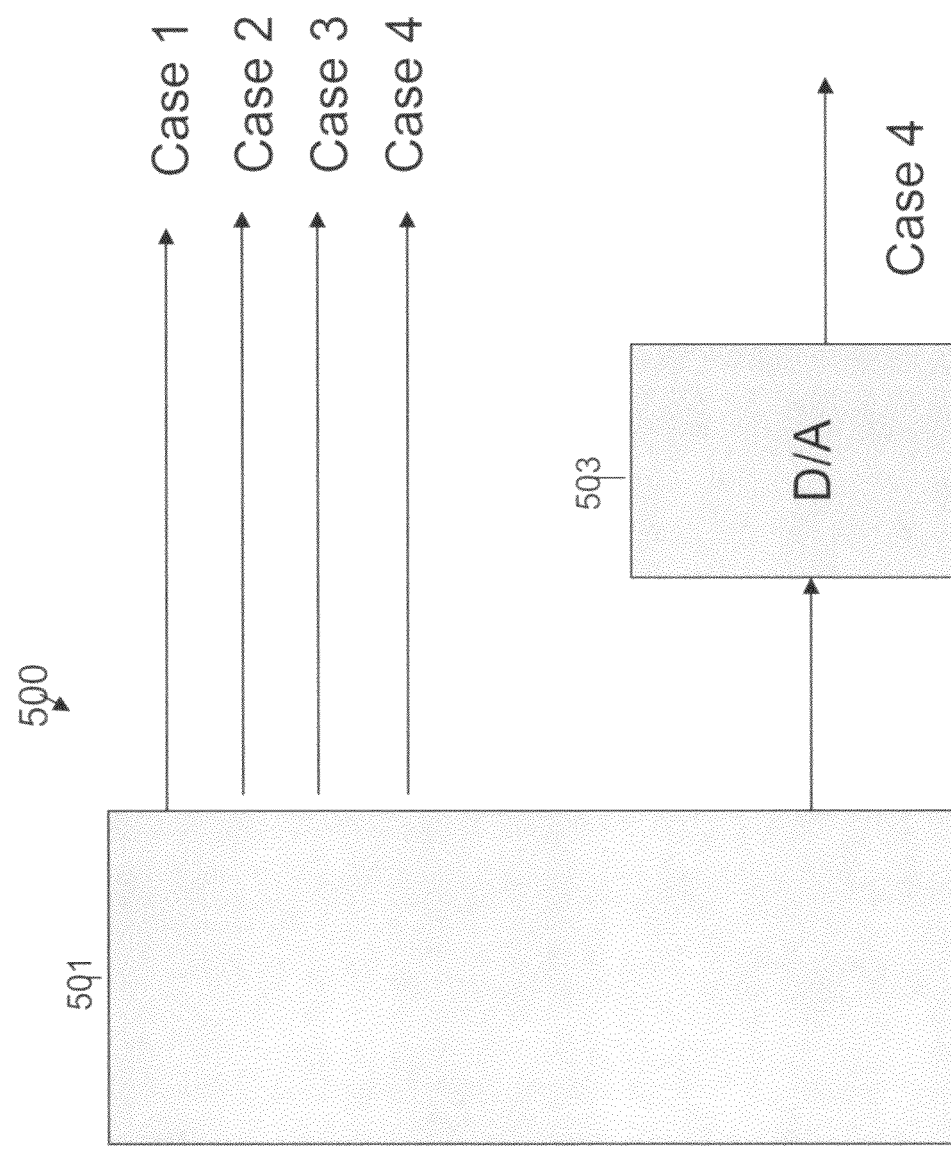
FIG. 5 shows the output process for the four data types of FIG. 2.

The Pico receiver can connect to devices using various external or internal interconnects such as PCI, miniPCI, USB, Cardbus and PC Card, or cable or digital TV connectors. The output data of a Picon receiver can be directly sent to a display device. For the signals that are originally analog, the output digital data may first be converted into analog signal by a digital to analog converter 503 as shown in FIG. 5 before sending to a display device.

In one embodiment, the application layer of the Picon transmitter includes a pre-processing module and a control module. The pre-processing module can perform pre-processing of the audio/video such as partitioning of encrypted and compressed data. The control module provides a standard way to exchange data stream information. Before a connection begins, the control module negotiates the data formats to be used, and when the need for the connection is completed, the control commands are used to stop the connection.

To guarantee Quality of Service, the system also includes packet loss prevention and packet recovery mechanism. The control module determines the route of processing for each type of datastreams. Generally for uncompressed & unencrypted datastream, the input data will be compressed and transceived over the multichannel mechanism, both packet loss prevention and packet recovery may be initiated. For uncompressed & encrypted data, the input "higher" data rate will be directly transmitted using multi-streaming and multi-channeling mechanisms including packet loss prevention process, but packet recovery process may be omitted since no compression is involved. For already compressed & encrypted data the input data will be transmitted using only multichanneling mechanism and packet recovery may also be required.

For compressed but unencrypted data, the input data is sent and received over one of the multi-channeling mechanism, packet loss prevention is applied as well as packet recovery after decompressing the received data.

The transmission and receiving of the wireless signals are controlled by the control module which dynamically allocates channels based on performance statistics. In one embodiment, it monitors and analyzes the performance of each channel and allocates the channels dynamically based on their performances as well as the configuration criteria. For example, if one of the channels shows degradation in performance, that channel will be replaced with a more robust channel to avoid further packet losses. This way, the packets are first stored in a frame buffer and they are scheduled and classified dynamically before they are transmitted.

The control module dynamically maps communication channels and timeslots in a network so that multiple channels can be reused simultaneously throughout the network during the same timeslot in a fashion that does not create collisions.

For example, the Picon media server serving as a central server first determines the network topology of its wireless communication network in order to identify its client nodes or client devices and the discrete link a node or client has. Timeslots for transmission of packets between server and a particular node device are then identified and a separate channel is assigned. The various timeslots and communication channels are dynamically mapped across the network to maximize throughput and then queued up packets are transmitted over the various channels during the various timeslots in accordance with the dynamically changing mapping. The dynamically changing mapping allows maximum flexibility for spikes in throughput by individual nodes and also accounts for efficient ingress and egress of nodes in the wireless network.

Figure 6:
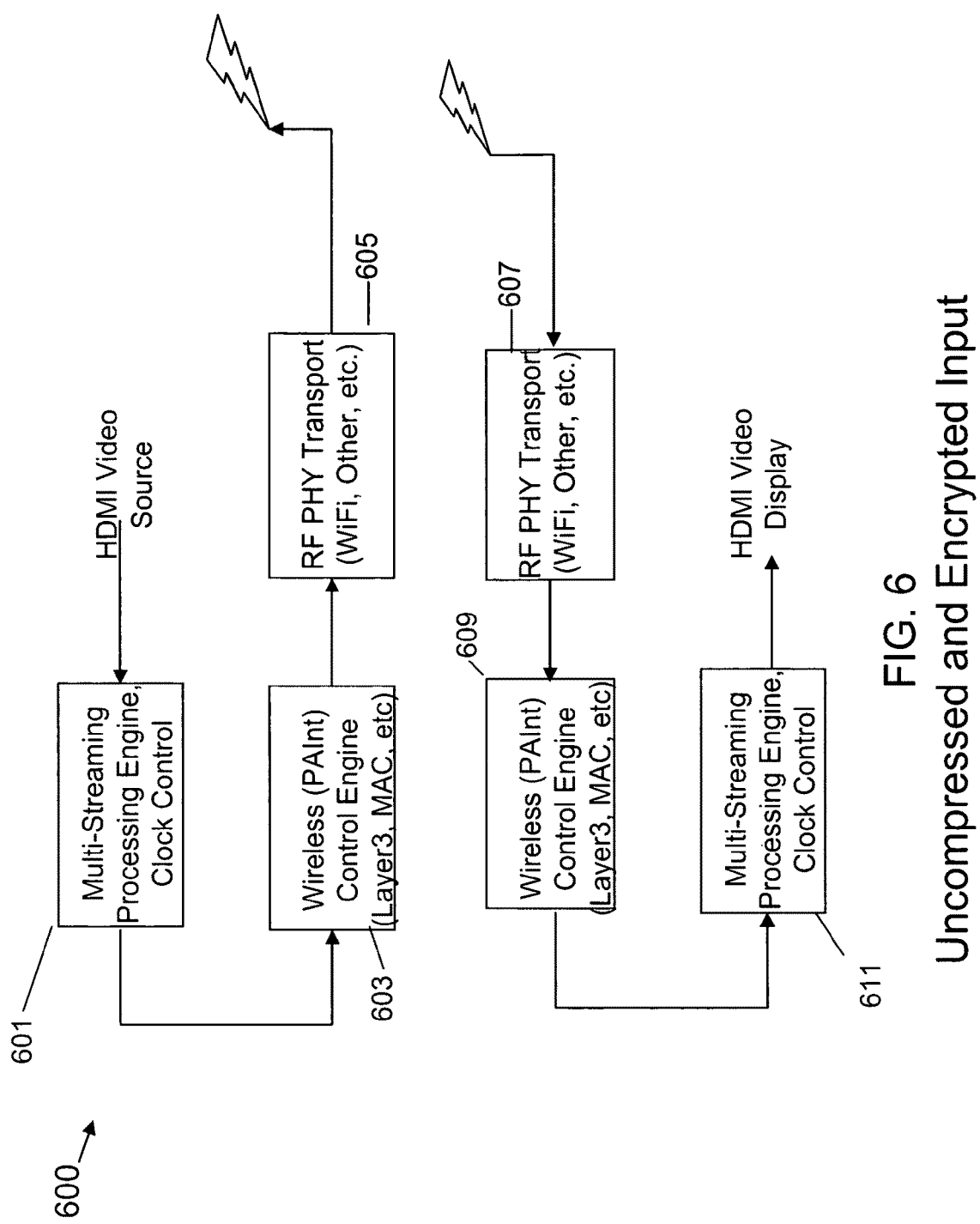
FIG. 6 shows an example of data processing for Case 3 of FIG. 2.

For Case 3 of FIG. 2, the control module decides that the input data stream is uncompressed and encrypted, such as a HDMI video stream, as shown in FIG. 6, the control module directs the data stream to the correct processing module 601 for multi-plexing and multi-streaming. The single input datastream is then split into plurality of sub-streams, which are further processed and packed for proper transmission, and are transmitted by application layer and PHY layer 603 and 605 via multiple-channels. The Picon receiver (607, 609) receives the wireless transmitted digital signals from the transmitter of the Picon media server and conducts the reverse-processing to re-assemble signals received through its multiple channels to a single stream and to the original format or according to the configuration (611). The mechanism of packet loss prevention is applied by dynamic channel assignment during the transmission to improve performance and efficiency.

Figure 7:
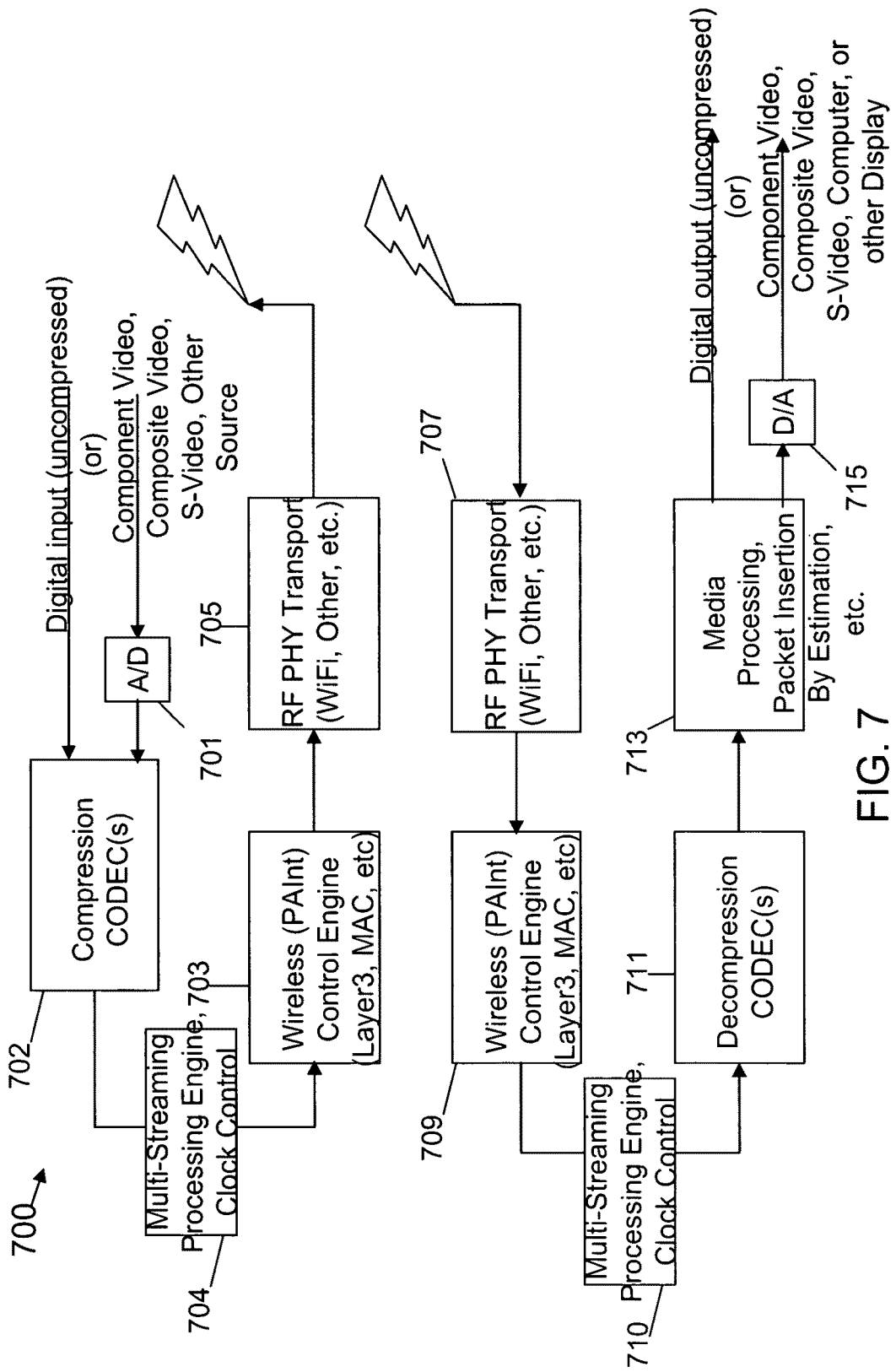
FIG. 7 shows an example of data processing for Case 4 of FIG. 2.

For Case 4 of FIG. 2, the control module decides that the input data stream is uncompressed and unencrypted, as shown in FIG. 7, the datastream is first sent to CODEC 702 for encoding and compression. After compression, the datastream can be transmitted directly sufficiently low data-rate stream without multi-streaming. The control module then directs the data stream to the proper processing module 704. After being processed for transmitting, the properly packed packets are transmitted via application layer and PHY layer 703 and 705. The Picon receiver (707, 709) receives the wireless transmitted digital signals from the transmitter of the Picon media server and conduct the reverse-processing to decode and reconstruct the signals back (710, 711) to the original format of the signals or according to the configuration. Because of the compression/de-compression process, a further procedure of packet recovery is performed by using signal estimation insertion methods (713). If Case 4 is originally of analog signals, signals may be pre-processed with A/D converter (701) and post-processed with D/A converter (715).

Figure 8:
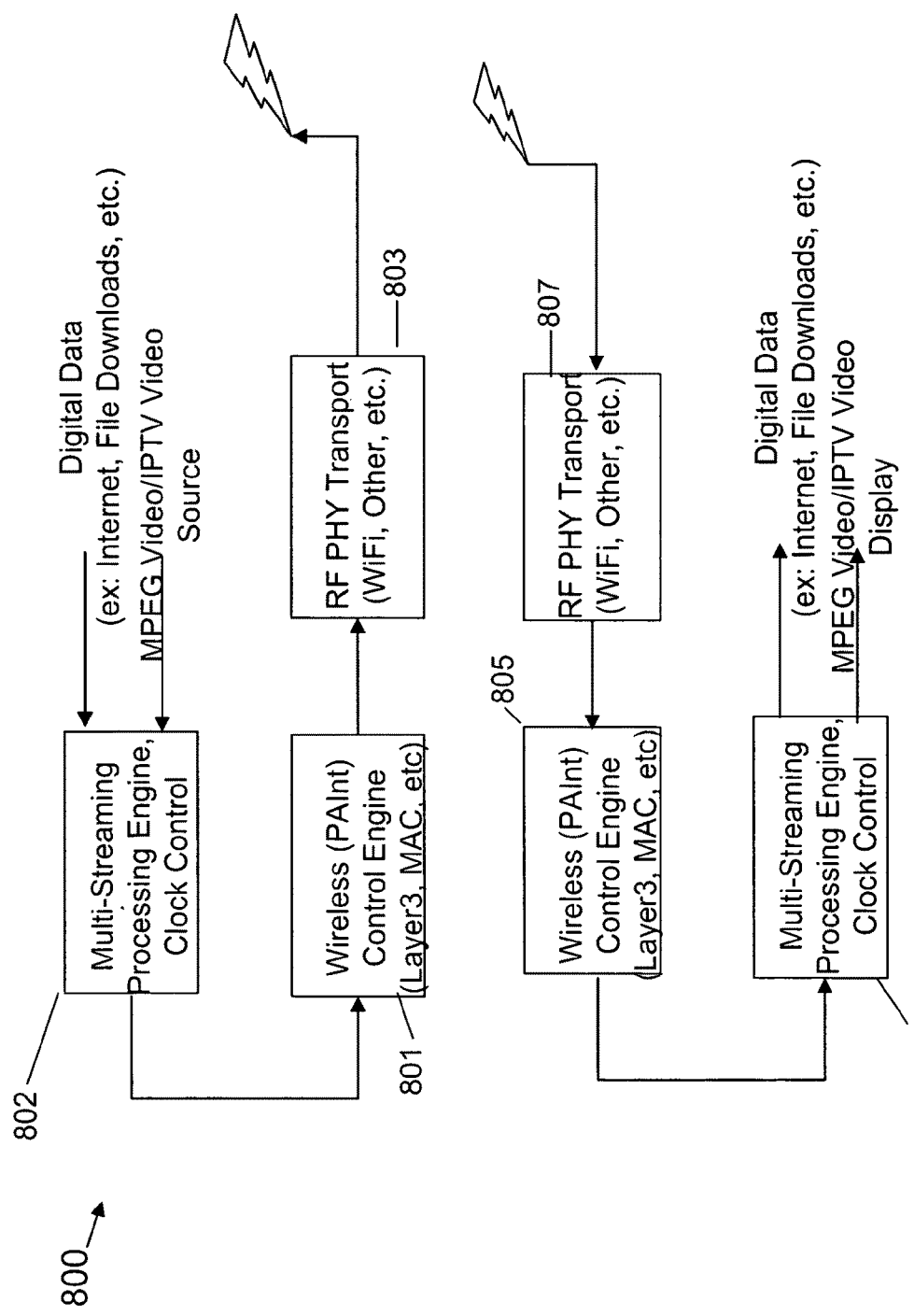
FIG. 8 shows an example of data processing for Case 1 and 2 of FIG. 2.

For Cases 1 and 2 of FIG. 2, the control module decides that the input data stream is compressed and encrypted/unencrypted, as shown in FIG. 8, and that the compressed signal can be directly transmitted using multi-channeling mechanism. The datastream is directed to the individual proper processing unit for suitable channels, and the datastream is passed to the application layer 801 for further packaging and to PHY layer 803 for transmission, which would perform packet loss prevention by dynamically assign the datastream to the channels of good performance. The Picon receiver would receive the wirelessly transmitted digital signals and conduct the reverse-processing of the signal by an embedded processing unit 807, 805, 809, and these processing units may also conduct a packet recovery process by detecting any loss of signal, and inserting estimated signals for such lost signals, and converting the datastreams back to the original format or a specified format according to configuration for subsequent play and display.

One embodiment of the structure of a Picon processing layer can further contain an add/drop multiplexer module which dynamically communicates with the FHY layer of fiber backhaul and the control unit and router unit; the control unit communicates with multiplexer, router/buffer/firewall/QoS and also the transceivers which includes encryption processor, Wi-Fi like chipset and set of radio frequency components and antennas.

Transition Minimized Differential Signaling (TMDS) protocol can be used for signal integration and congregation of the packets. In TMDS, video, audio, and control data are carried as a series of 24-bit words on three TMDS data channels with a separate TMDS channel for carrying clock information. Additionally, DVI/HDMI systems may include a separate bi-directional channel known as the Display Data Channel (DDC) for exchanging configuration and status information between a source and a sink, including information needed in support of High-Bandwidth Digital Content Protection (HDCP) encryption and decryption. In HDMI, an optional Consumer Electronic Control (CEC) protocol provides high-level control functions between audiovisual products.

The Picon system can be further configured to work with the current cellular phone system enabling a cellular phone to function as a user interface for users to choose input/output terminals. An example pairing procedure is as follows:

PHS (Picongen Headset Profile) pairs with a Bluetooth equipped cellular phone as follows:
  Customer sets PHS into pairing mode by pressing a button on the PHS.
  The PHS indicates to the user that it is ready for pairing.
  The customer prepares his mobile phone for discovery of a new Bluetooth HS Headset Profile) device.
  The phone performs a Bluetooth inquiry and gets a response from the PHS.
  As part of the LMP (Link Manager Protocol) channel set-up, the PHS demands authentication of the phone.
  The phone detects that it does not have any previous link key with the PHS. The Bluetooth pairing is requested.
  The phone prompts the user to enter the passkey for the PHS.
  The customer inputs the passkey. A key exchange is performed between the PHS and the phone. A link key is derived that is shared between the telephone and PHS.
  The new link key between the PHS and the telephone is stored in nonvolatile memory in both the phone and the PHS unit.
  The PHS authenticates the phone.
  The phone authenticates the PHS.
  The PHS and the phone perform an encryption key exchange.
  The LMP set-up is now complete. The PHS and the phone encrypt all data they exchange from now on.
  The customer now switches the PHS out of the pairing mode so it will no longer accept any new inquiries or pairing requests.

PHS can also perform a virtual pairing with a cellular phone:
  Customer sets PHS into virtual pairing mode by pressing another button on the PHS.
  The PHS indicates to the user that it is ready for virtual pairing.
  The customer prepares his mobile phone for discovery of a new Bluetooth HS device.
  The phone performs a Bluetooth inquiry and gets a response from the PHS.
  As part of the virtual LMP channel set-up, the PHS demands authentication of the phone.
  The phone detects that it does not have any previous link key with the PHS. The Bluetooth pairing is requested.
  The phone prompts the user to enter the passkey
  At this stage the user enters the passkey for his HS.
  The customer inputs the passkey of his HS.
  This passkey is stored in Picon.
  A key exchange is performed between the PHS and the phone. However, the PHS sends an invalid key to cause the procedure to fail. A link key is however, derived by the PHS.
  The new link key that belongs to the HS is stored in nonvolatile memory in the PHS unit.
  The PHS does not authenticate the phone.
  The phone stops the pairing procedure.
  The customer now switches the PHS out of the pairing mode so it will no longer accept any new inquiries or pairing requests.

Once the customer established the pairing between Picon and the phone, Picongen Audio Gateway Profile (PAG) or Picongen Video Gateway Profile can also pair with the HS:
  Customer sets HS into pairing mode by pressing a button on the HS.
  The HS indicates to the user that it is ready for pairing.
  The customer prepares his the PAG for discovery of a new Bluetooth HS device by pressing yet another button on PAG.
  The PAG performs a Bluetooth inquiry and gets a response from the HS.
  As part of the LMP channel set-up, the HS demands authentication of the PAG.
  The PAG detects/decides that it does not have any previous link key with the PHS. The Bluetooth pairing is requested.
  The PAG automatically retrieves the passkey previously stored in the Picon.
  A key exchange is performed between the HS and the phone. A link key is derived that is shared between the PAG and HS.
  The customer doesn't need to enter the passkey this time.
  The new link key between the HS and the PAG is stored in nonvolatile memory in both the PAG and the HS unit.
  The HS authenticates the PAG.
  The PAG authenticates the PHS.
  The HS and the PAG perform an encryption key exchange.
  The LMP set-up is now complete. The HS and the PAG encrypt all data they exchange from now on.
  The customer now switches the HS out of the pairing mode so it will no longer accept any new inquiries or pairing requests.

The Multi-Streaming Mechanism

Long-haul communications and most network systems use serial communication which is the process of sending data one bit at one time, sequentially, over a communications channel or computer bus. This is in contrast to parallel communications, where all the bits of each symbol are sent or resent together. The cost of cable and synchronization difficulties make parallel communications impractical.

The Picon multimedia server and receiver disclose a novel multi-streaming mechanism for a single high-data rate communication by multiplexing high data rate multi-media data streams into multiple lower data rate, Wi-Fi capable data streams in combination with usage of multiple antennas and radio frequency channels and dynamic allocations of channels as well as prioritization and scheduling control of data packets.

Figure 11:
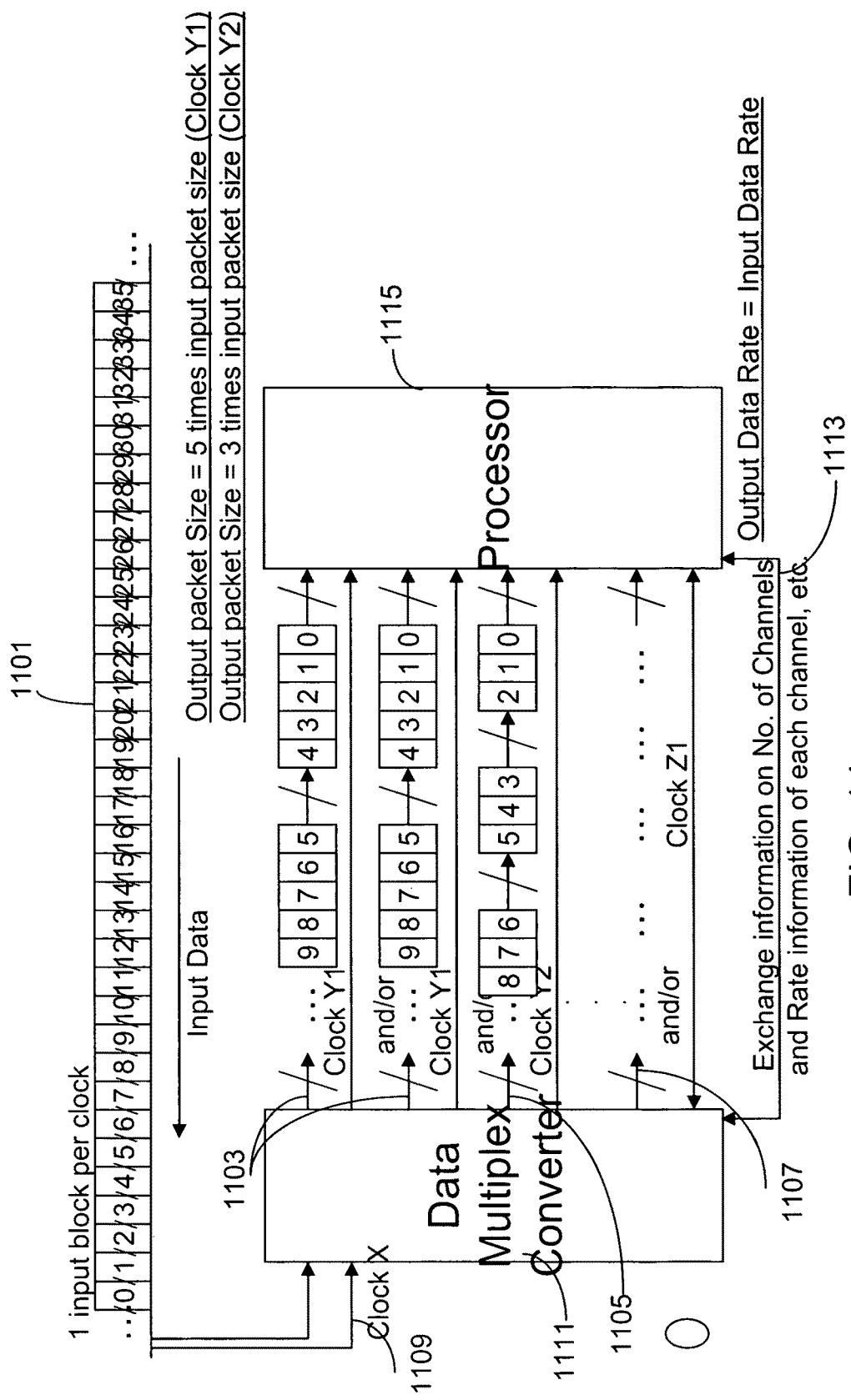
FIG. 11 depicts an example of the multi-streaming mechanism in a Picon system.

FIG. 11 shows a data stream splitting mechanism wherein high clock rate serial data is converted into multiple parallel lower clock rate data streams and the output data rate equals input data rate. In this example, input data stream 1101 is transported at 1 input block per clock with X clock rate. The data is inputted into the Data Multiplex Converter 1111 and the data stream is repacked in the same serial order into 5 blocks per clock with a clock rate Y1 (1103) that equals X/5; the data stream can also be packed into other sizes, such as 3 blocks per clock with a clock rate Y2 (1105) that equals X/3. The data stream can also be packed into other sizes, such as clock rate Z1 (1107) according to specific configuration of a channel. The output sub-datastreams may be a combination of multiple channels of data streams having different clock rate. In FIG. 11, there are at least four channels: two having Y1 clock rate, one having Y2 clock rate, and one Z1 clock rate. The repacketized data packets are sent to processor 1115 for further processing. Processor 1115 and data multiplex converter 1111 exchange information about number of channels and data rate of each channel (step 1113).

Figure 12:
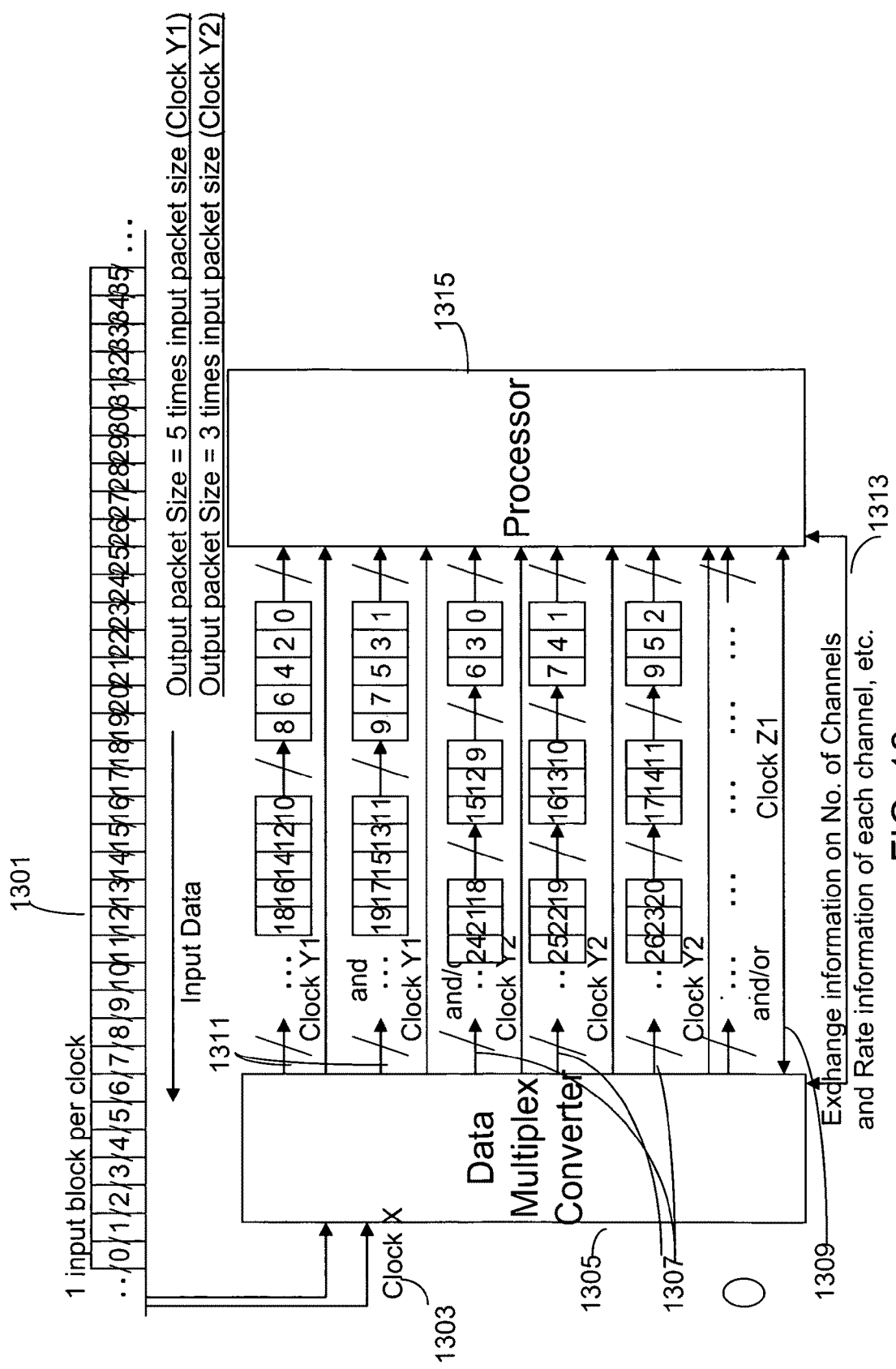
FIG. 12 depicts another example of the multi-streaming mechanism in a Picon system.

FIG. 12 shows a decimated datastream splitting mechanism where the output data rate is half of input data rate. Similar to FIG. 11, input data stream 1301 is transported at 1 input block per clock with X clock rate (1303). The data is inputted into the Data Multiplex Converter 1305 and data stream is repacked into 5 blocks per clock with a clock rate Y1 (1311) that equals X/5; the data stream can also be packed into other sizes, such as 3 blocks per clock with a clock rate Y2 (1307) that equals X/3. The data stream can also be packed into other sizes, such as clock rate Z1 (1309) according to the configuration of the channels. However, the order of data blocks are packed differently than that in FIG. 11, for instance, in channels for Y1, the sequential data blocks are repacked every other block together; in channels for Y2, the sequential data blocks are repacked every third together. The resulting output data rate is therefore half of the input data rate. This processing provides maximum control and flexibility to the system to avoid data interferences. The repacketized data packets are sent to processor 1315 for further processing. Processor 1315 and data multiplex converter 1305 exchange information about number of channels and data rate of each channel (step 1313).

Figure 13:
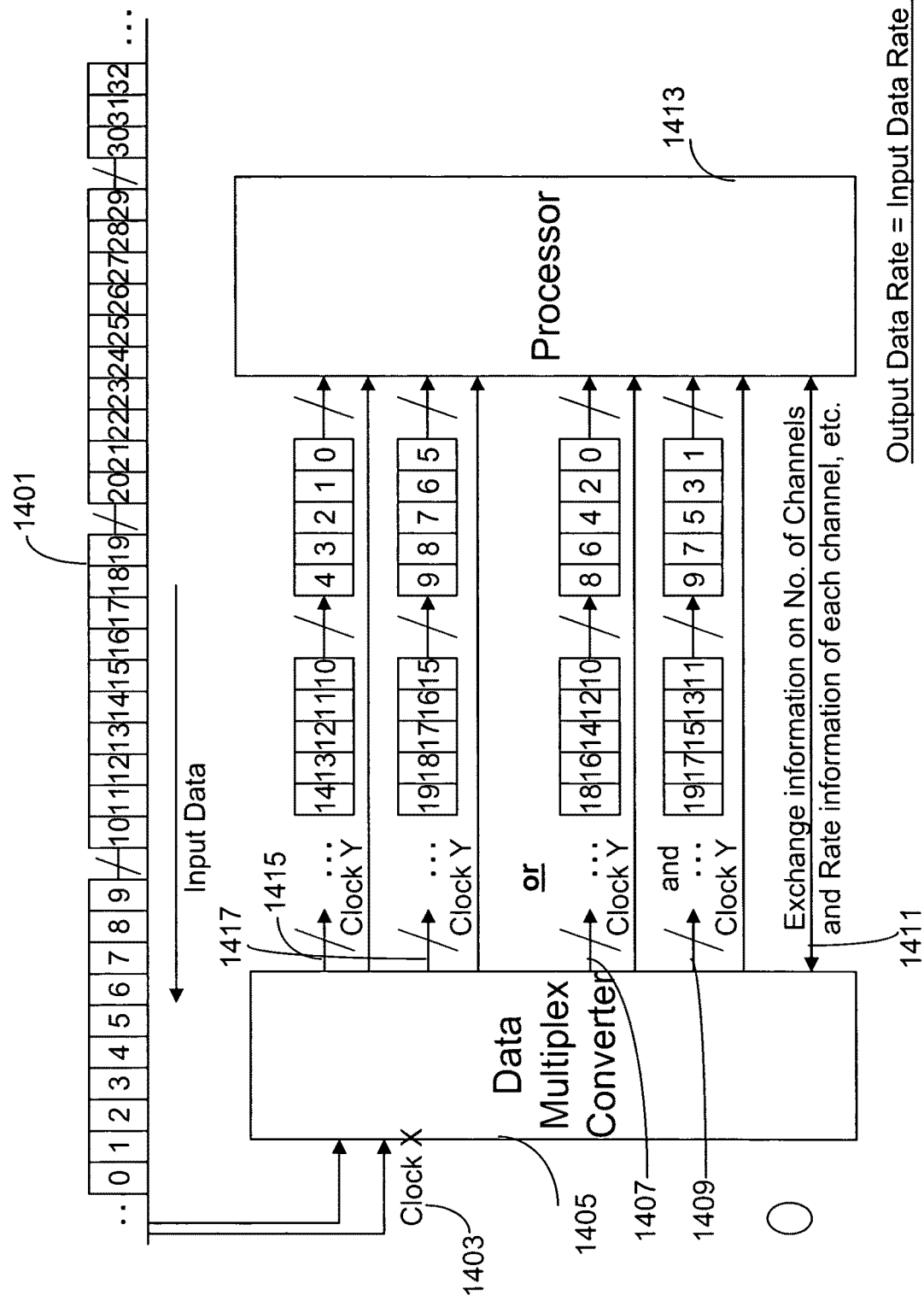
FIG. 13 depicts another example of the multi-streaming mechanism in a Picon system.

FIG. 13 shows a splitting mechanism where the multiple output channels of data streams have the same clock rate as the input data stream, whereas the output packet size per clock is a fraction of the input packet size per clock. For instance, the clock rate Y of the output channels equals the input clock rate X, but input data stream is transported at 10 input blocks per clock while the output data streams have 5 blocks per clock. However, different channels may take a different packing pattern, for instance, for 1415 and 1417 the data packets are packed in sequential order while for channel 1407 and 1409, the data packets are packed every other block together.

Figure 14:
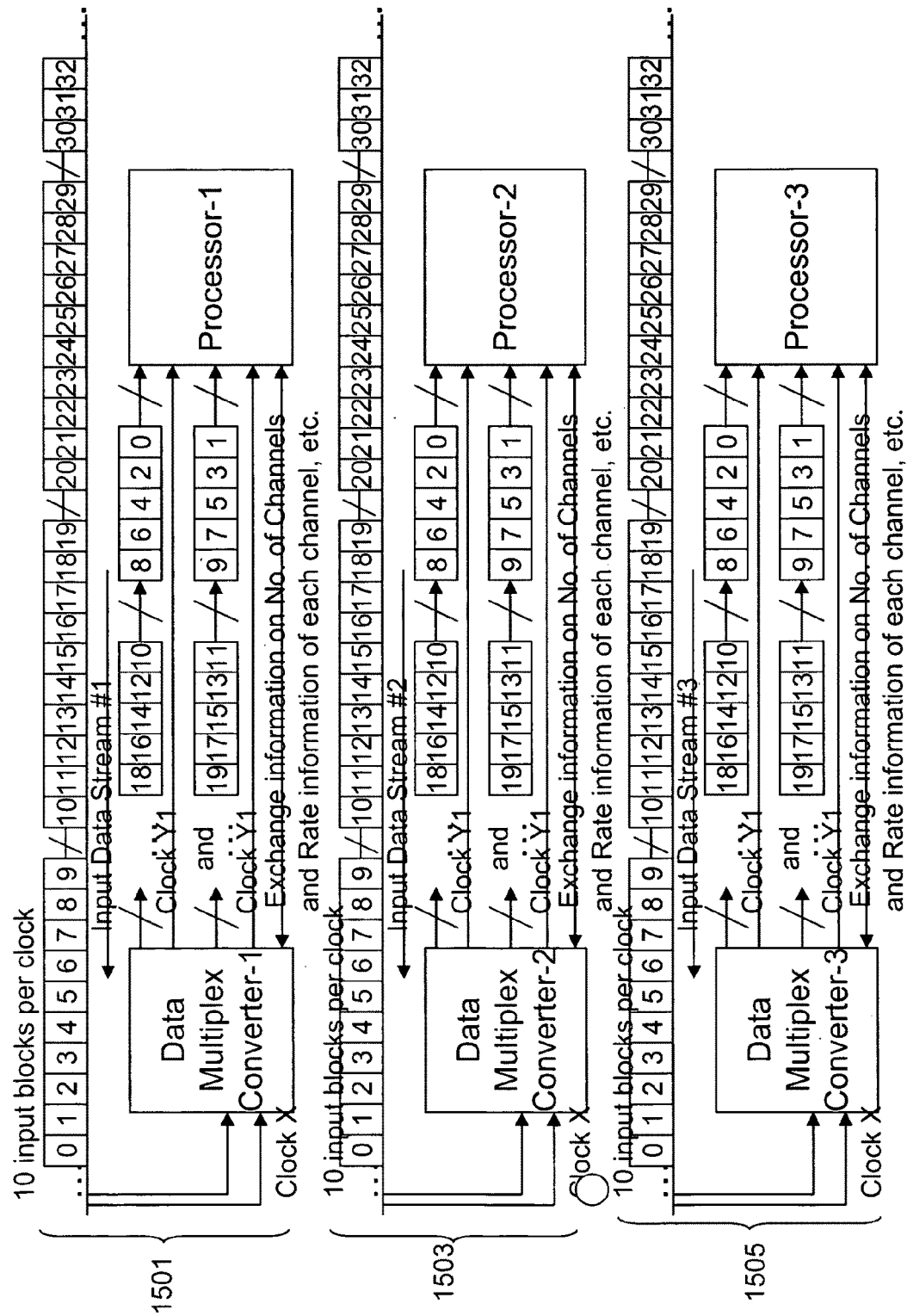
FIG. 14 depicts a parallel multi-streaming architecture in a Picon system.

FIG. 14 shows an embodiment having plurality of multiplexing converter units (1501, 1503, 1505). A single data stream is first split onto three separate data streams by parallel processing through three multiplex converter processors; and each processor splits the data streams into further sub-streams by repacking the data packets into different sizes or data streams of less clock rate.

Figure 15:
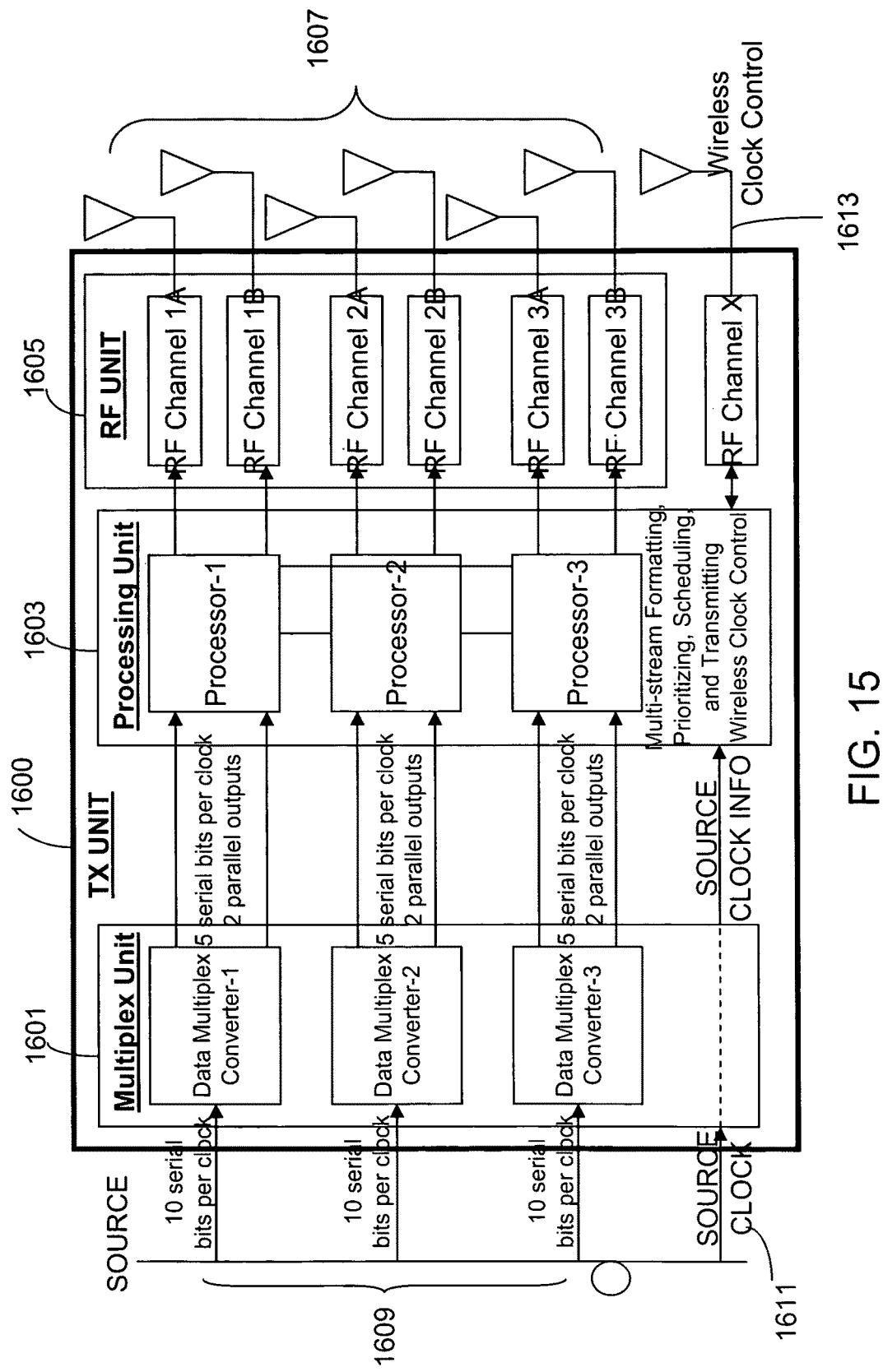
FIG. 15 depicts an example architecture of the multi-streaming transmitting unit in a Picon system.

FIG. 15 shows an example architecture of the multistreaming mechanism. The transmitting unit 1600 includes a multiplex unit 1601 for splitting high data rate into low data rate substreams, processing unit 1603 for data flow controlling, packet loss prevention, packet re-formatting, channel assignment, etc and radio frequency unit 1605, which comprising multiple channels for transmitting each data sub-stream.

A single high data rate source stream is first processed at 1609 by three parallel data multiplex converters, which then further repack the data stream into low data rate sub-streams using the mechanisms described in FIGS. 12, 13, 14, 15. The multiple substreams are further processed in parallel in multiple processing units for proper subsequent formatting, such as to comply with IP or IP secure protocols, for prioritizing and scheduling to increase performance efficiency, and for proper transmitting. The radio frequency unit 1605 includes multiple antennas (1607) for wireless transmitting the data packets, with specific channel assignment. The wireless transmitting protocol may be IP based Wi-Fi like transmission, or 2G/3G like telecommunication standards. In the meantime, a clock source 1611 is simultaneously transmitted (1613) for data synchronization.

Figure 16:
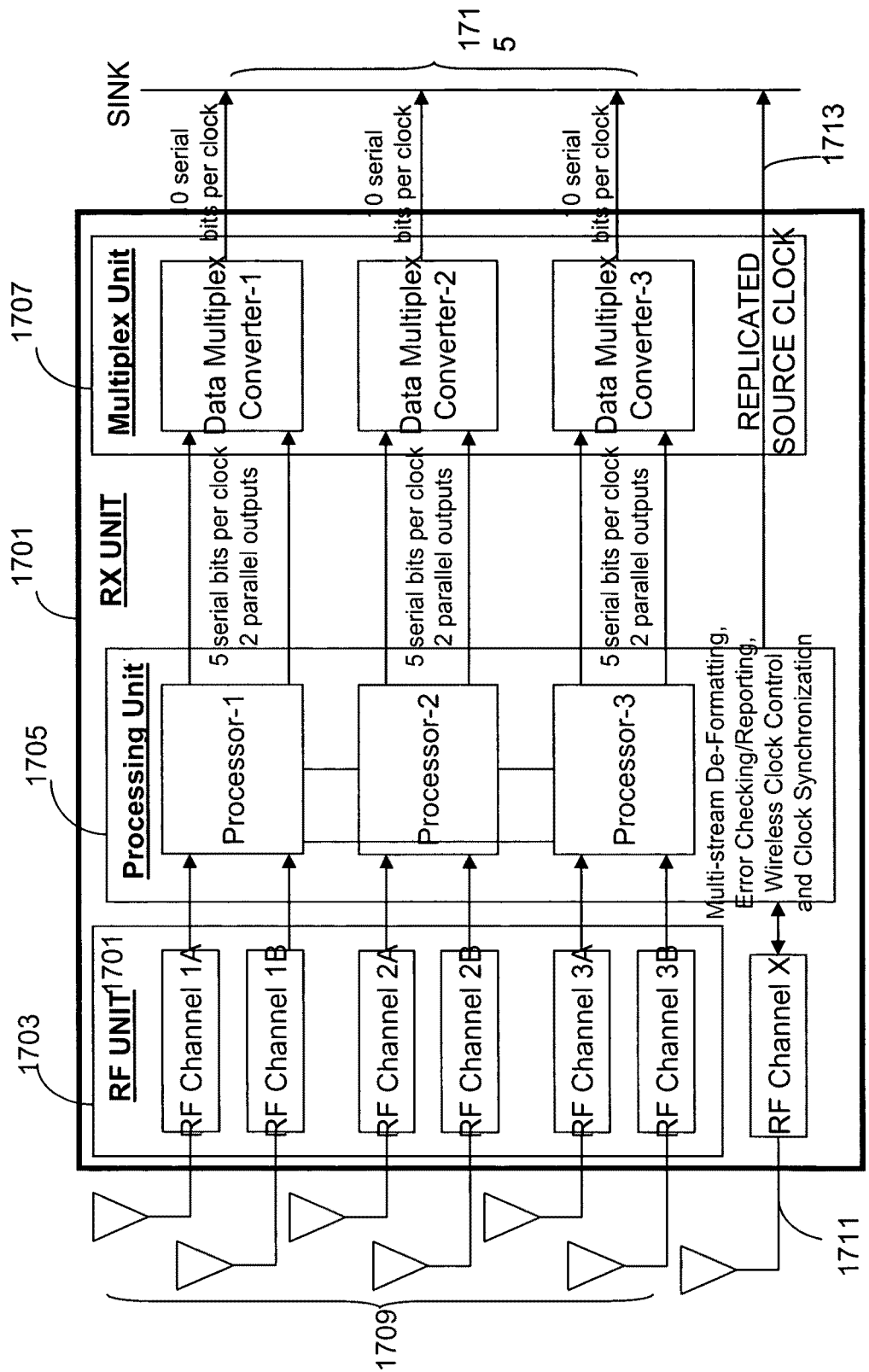
FIG. 16 depicts an example architecture of the multi-streaming receiving unit in a Picon system.

FIG. 16 depicts an example architecture of the transceiving mechanism for the multistreaming mechanism.

The transceiving unit 1701 includes the radio frequency receiving unit 1703, the processing unit 1705, multiplexing unit 1707. The receiving unit works in reverse mode as to the transmitting unit. The radio frequency unit 1703 has a comparable number of antennas in corresponding to the transmitting unit and receives the transmitted signals on the specific assigned antennas or channels. Signals received on a specific channel antenna are processed in parallel in one of the processors of processing unit 1705 which de-formats the data packet and extracts and reconstructs them into the original data stream. Other processing may include packet loss detection and packet recovery by estimation. The extracted datastream and configuration information are passed to the multiplex unit 1707 which has multiple multiplex data converters working in parallel to reassemble the low data rate stream into to high data rate stream using the reverse processes and mechanisms described in FIG. 12, 13, 14. The data packets may be reassembled using packet index, frame index or timestamps and datastream IDs or other identification methods, including IP addresses and destination port numbers etc. A reference source clock 1713 is used to synchronize data packet and to correctly re-assemble the multiple substreams into the original single high data rate stream or the format specified by the configuration and to be sent to terminal devices as clock reference for display or play.

It is contemplated and considered that each of the processors and data multiplex converters of the transmitter and the receiver side do not have to be specifically pre-assigned and fixed, they may be dynamically assigned and allocated at the real time and be controlled by a central processing unit to coordinate their functions.

The initial parallel processing of data by multiple multiplexing processors and subsequent transmission may be implemented through variety of mechanisms.

In one embodiment, the principles of spatial multiplexing is applied as if for multiple users of multiple data streams. If these signals arrive at the receiver antenna array with sufficiently different spatial signatures, the receiver can separate these streams, creating parallel channels for free. Spatial multiplexing increases channel capacity at higher Signal to Noise Ratio (SNR).

The signal is emitted from each of the transmit antennas where certain principles of full or near orthogonal coding can be used.

Signals can also be enhanced using principals of Diversity which exploits the independent fading in the multiple antenna links to enhance signal diversity.

Spatial multiplexing can also be combined with preceding when the channel is known at the transmitter or combined with diversity coding when decoding reliability is in tradeoff.

In one embodiment, frequency-division multiplexing (FDM) and frequency-division multiple access (FDMA) is implemented to the data streams of a single user where a multimedia stream is split among multiple channels by assigning distinct and nonoverlapping sections of the electromagnetic spectrum within the passband to individual unit of data packets. The information stream of a particular multimedia content is encoded into a signal whose energy is confined to the part of the passband assigned to that particular multimedia content.

In one embodiment, time-division multiplexing (TDM) and time-division multiple access is used that an access to a passband is limited in time by a particular part of multimedia data stream, after which the access right is assigned to another part of data streams. And statistical time-division multiplexing assigns time on the channel on a demand basis.

In one embodiment, code-division multiple access (CDMA) is used where all data streams are assigned the entire passband of the channel and are permitted to transmit their information streams simultaneously. But at the transmitter each signal is encoded on it a characteristic signature to indicate its source and identity.

In one embodiment, space-division multiple access (SDMA) is used where data packets may be transmitted using the same portion of the electromagnetic spectrum over two or more spatially distinct multibeam antennas.

Wireless Clock Synchronization Mechanism

Conventional HDMI cable contains multiple wired connections for data transfer including 1 wired line for CLOCK. This wire provides the source HDMI clock from a source such as an HD DVD player to the destination HDMI clock, such as an HDMI plasma TV. This signal is required to synchronize the data for transfer and HDMI encryption. The HDMI cable connected between the DVD player (source) and the TV (destination) provides this CLOCK line. However, for a wireless system, where the DVD player is now connected to a wireless transmitter and the TV is connected to a wireless receiver, the CLOCK line is missing. This application discloses novel methods in transmitting a wireless clock line.

The source HDMI clock is first obtained from a HDMI source, for example, a DVD player, by the transmitter. The transmitter then acts as a "proxy" for the destination, for example, a TV. So as far as the DVD player is concerned, it "thinks" it is indeed connected to the TV. Similarly on the receiver end, the receiver acts as the "proxy" for the source (DVD player). So as far as the TV is concerned, it "thinks" it is connected to the DVD player. So, the CLOCK information is obtained from the DVD player by the transmitter, and the TV can obtain the CLOCK information from the receiver. Since different receivers may receive the source information at a different time due to difference in distance and difference in processing time, to regenerate the original CLOCK information, in other words to synchronize the transmitter clock with the receiver clock, a reference CLOCK which is available at both the transmitter and the receiver is needed.

Figure 17:
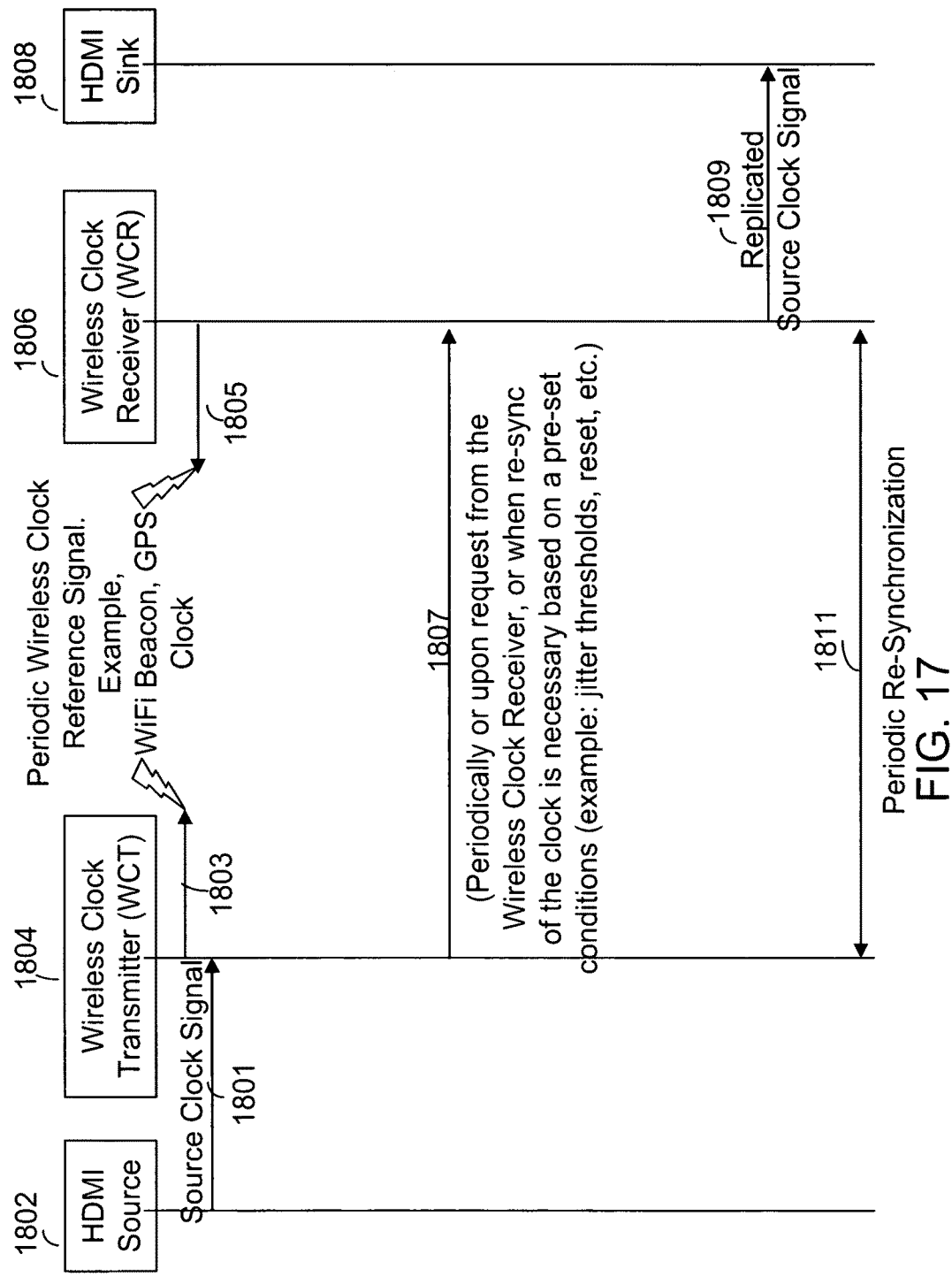
FIG. 17 shows an example functional process of a wireless clock control system.

FIG. 17 depicts the general process for transmitting a CLOCK reference. An HDMI source clock 1802 is transmitted (step 1801) to Wireless Clock Transmitter (WCT) 1804, which transmits a reference radio frequency such as WiFi Beacon or a GPS signal (step 1803). Wireless Clock Receiver (WCR) 1806 receives the transmitted clock reference and information about the source clock (at step 1805) and sends a replicated source Clock signal to HDMI sink 1808. WCT and WCR periodically synchronize (step 1807) and re-synchronize (step 1811) between each other.

Figure 18:
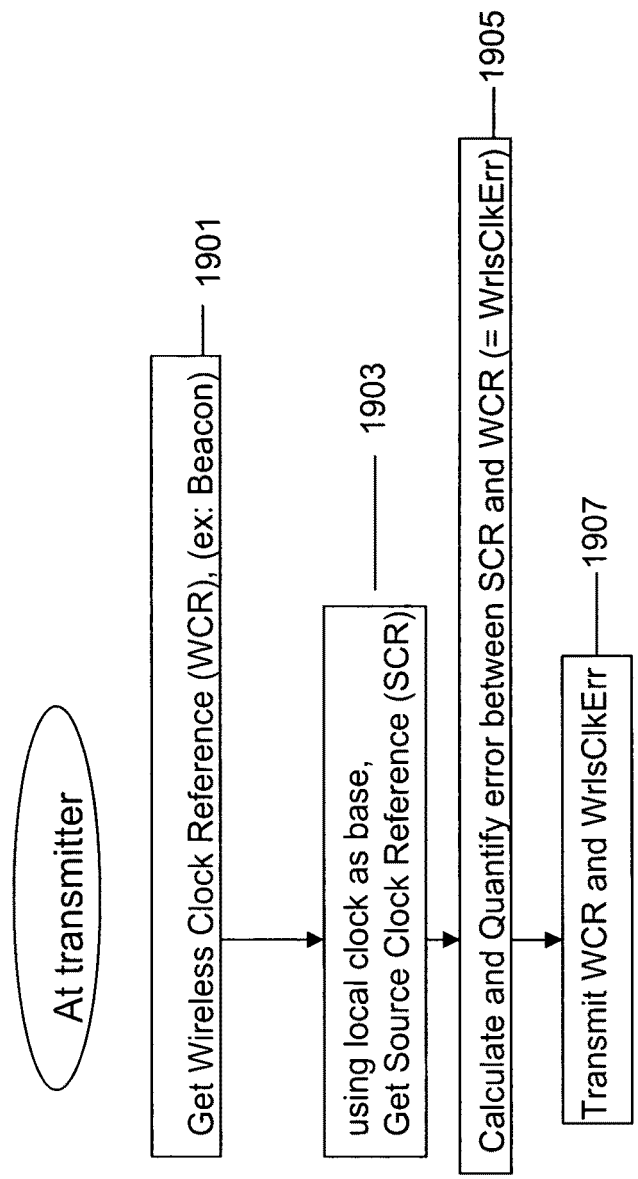
FIG. 18 shows a working process of a wireless clock control transmitter.
Figure 19:
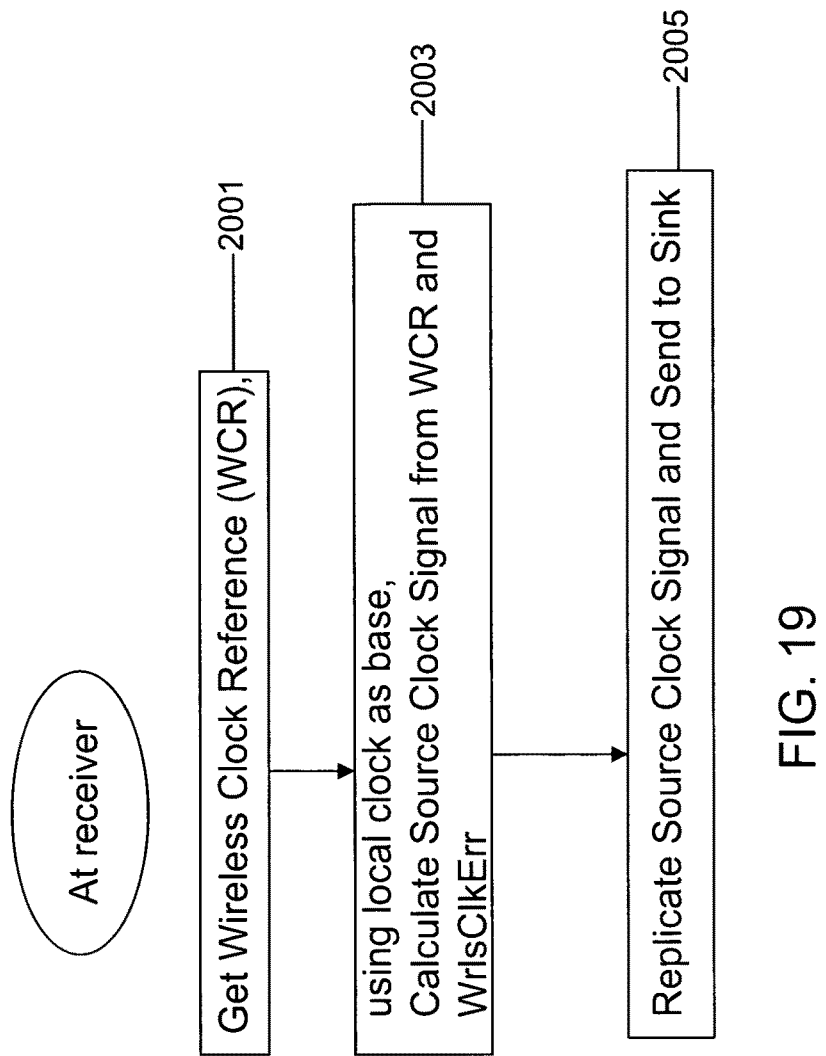
FIG. 19 shows a working process of a wireless clock control receiver.

FIGS. 18 and 19 show an example process of how the clock reference is transmitted in accordance with this disclosure. The clock transmitter first gets a wireless clock reference (WCR), such as WiFi beacon (step 1901). The transmitter then uses its local clock as a base, obtains the source clock reference (SCR) (step 1903). After calculating the clock difference (WrlsClkErr) between SCR and the WiFi beacon (step 1905), the transmitter transmits the WrlsClkErr and the WCR to the receiver.

At the receiver side, shown in FIG. 19, the receiver receives the WCR and WrlsClkErr (step 2001) and calculates the SCR using WCR, WrlsClkErr and its local clock as the base (step 2003). The receiver then replicates the SCR using the local clock phase and sends it to the sink (step 2005).

Figure 20:
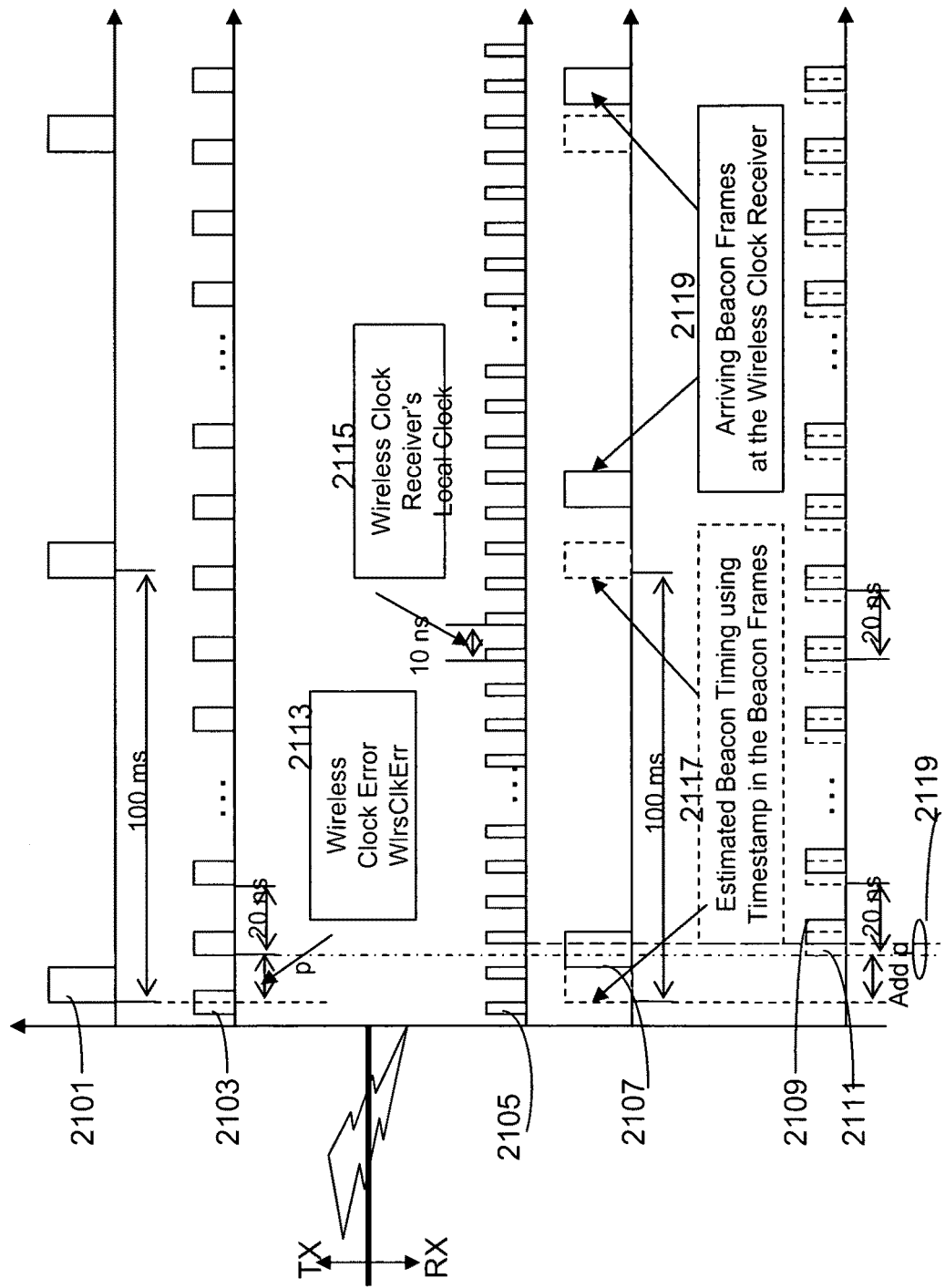
FIG. 20 shows an operation process for transceiving a wireless clock control to a sink using WiFi beacon clock frame.

FIG. 20 shows an example of using WiFi beacon as the wireless clock reference (WCR). For example, the WiFi beacon 2101 is transmitted at 10 kHz and the HDMI source clock 2103 is transmitted at 50 mHz, the closest clock error between 2101 and 2103 is calculated as p (2113) and is transmitted to a receiver.

At the receiver, the WiFi beacon clock frames arrive as 2107. Using the timestamp in the clock frames, the original WiFi beacon frames are estimated as 2117. The source clock reference (SCR) 2111 is then estimated by adding p to the estimated original WiFi beacon 2117 Clock frame. Using receiver's local clock 2105 as base, Initial Phase Difference 2119 is recalculated and used in re-synchronization. The Subsequent Phase Tracking is done by using Phase Lock Loop. The estimated SCR 2111 is replicated by taking into account the initial phase difference 2119 and is replicated at the starting time of the next local clock phase. The replicate SCR 2109 is sent to the sink.

Figure 21:
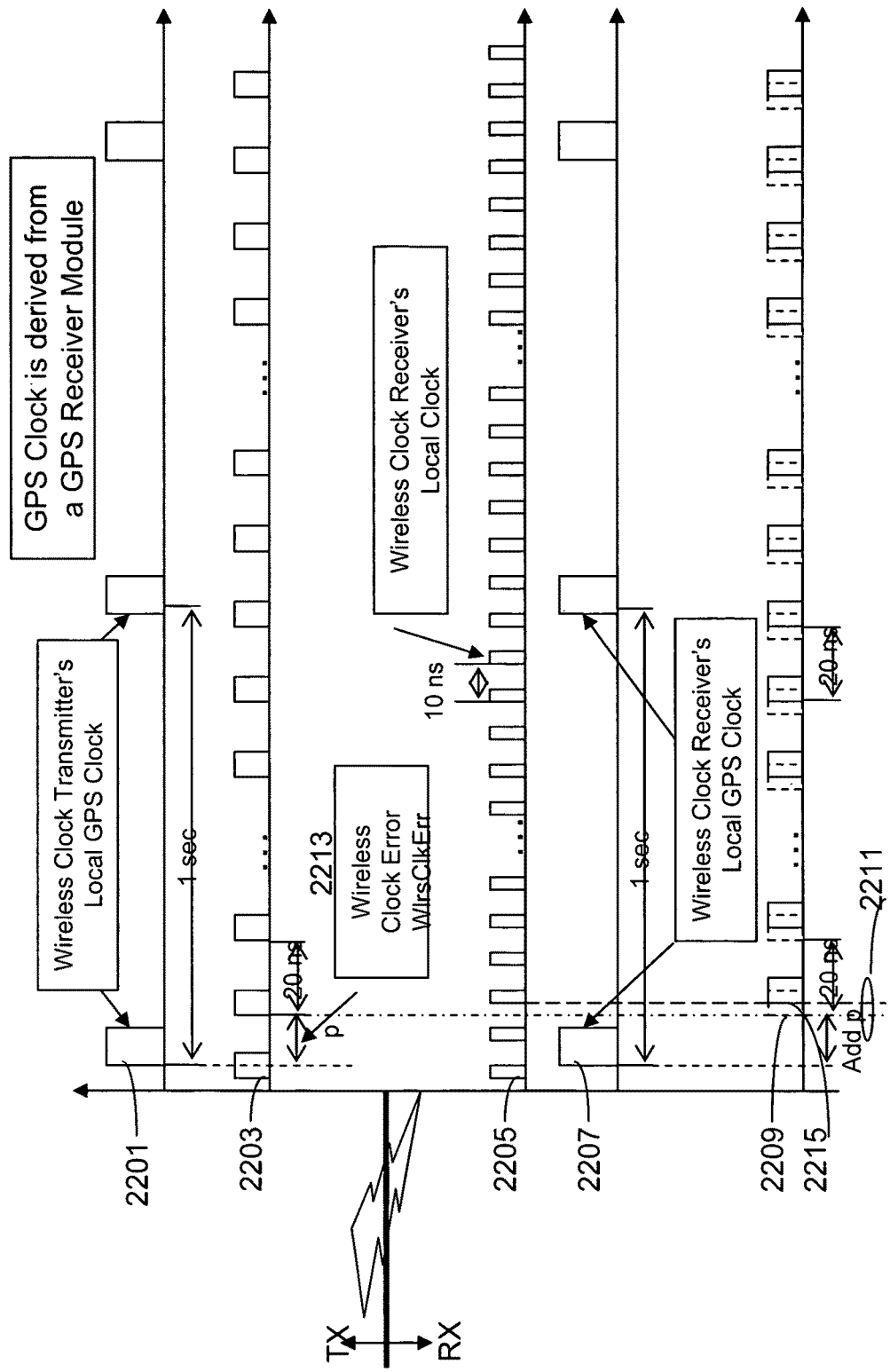
FIG. 21 shows an operation process for transceiving a wireless clock control to a sink using local GPS clock frame.

FIG. 21 shows an example of using GPS as the wireless clock reference (WCR) where the GPS clock is derived at the local GPS receiver module. The derived GPS clock 2201 at the transmitter side is used to calculate the clock error p (2213) between the HDMI source clock 2203. The closest clock error p between 2201 and 2203 is transmitted to a receiver.

At the receiver side, the same GPS clock 2207 is received and derived in the same way as 2201 from the local GPS receiver module. Then, the source clock reference (SCR) is estimated to be as 2209 by adding p to the 2207 GPS Clock frame. Using receiver's local clock 2205 as base, and the Initial Phase Difference 2211 is recalculated and used in re-synchronization. The Subsequent Phase Tracking is done by using Phase Lock Loop. The estimated SCR 2209 is replicated by taking into account the initial phase difference 2211 with the local clock frame and is replicated at the starting of the next local clock phase. Replicated SCR 2215 is then sent to the sink.

Picon System Packet Loss Recovery Mechanism

In most wireless communications, HD video is compressed first before transmitting to the wireless medium. Compression of the HD video is attractive because the overall required communication bandwidth and power can be significantly reduced, relative to transmission of the original, uncompressed video. However, with each compression and subsequent decompression of the video, some video information can be lost and the picture quality is degraded.

Figure 22:
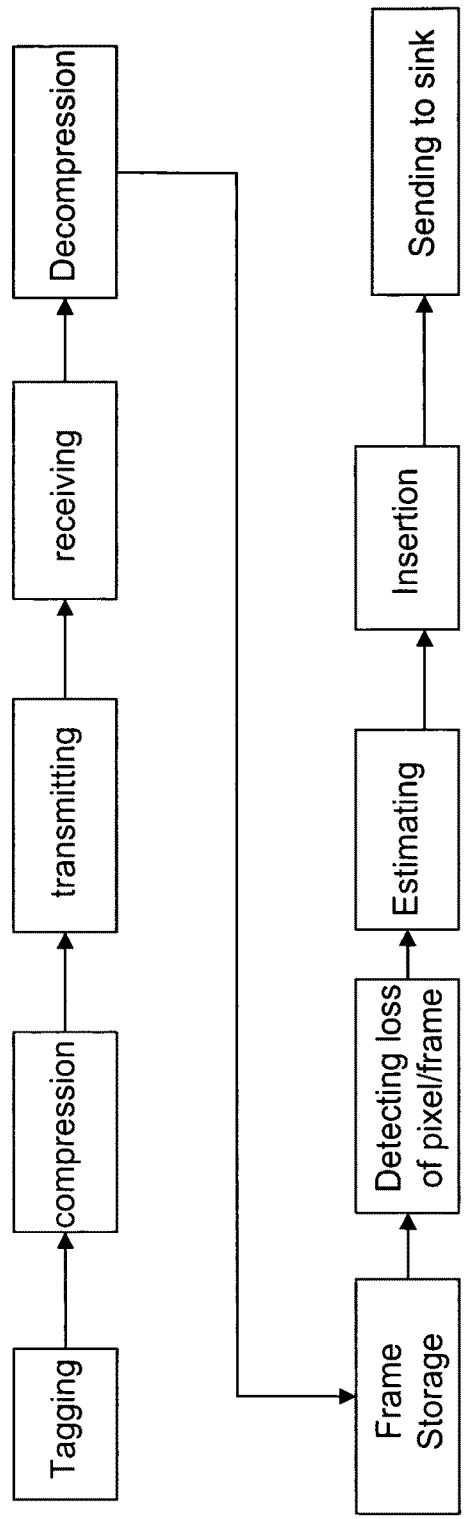
FIG. 22 shows a flowchart of the process for packet recovery.
Figure 23:
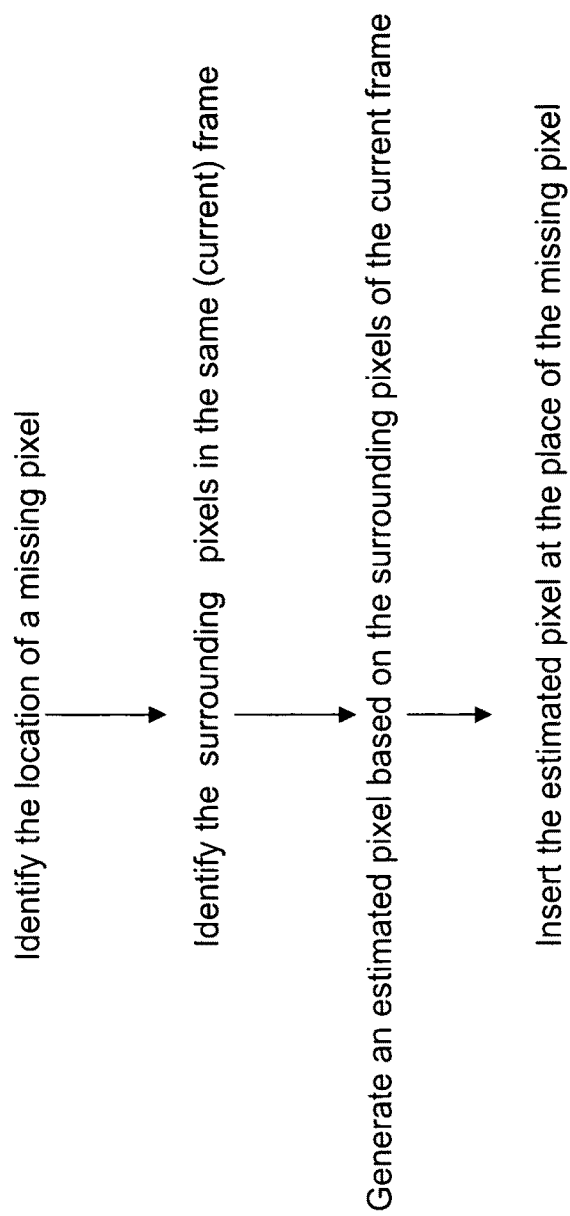
FIG. 23 shows an example of pixel estimation process in the process of packet recovery.
Figure 24:
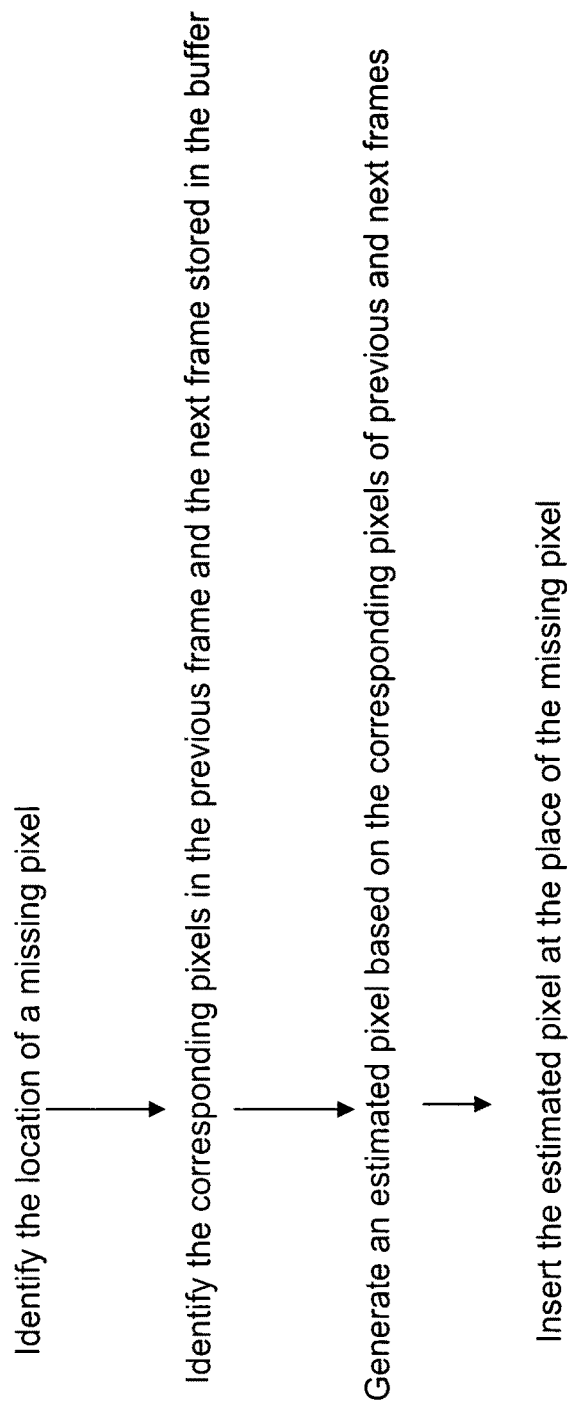
FIG. 24 shows another example of pixel estimation process in the process of packet recovery.
Figure 25:
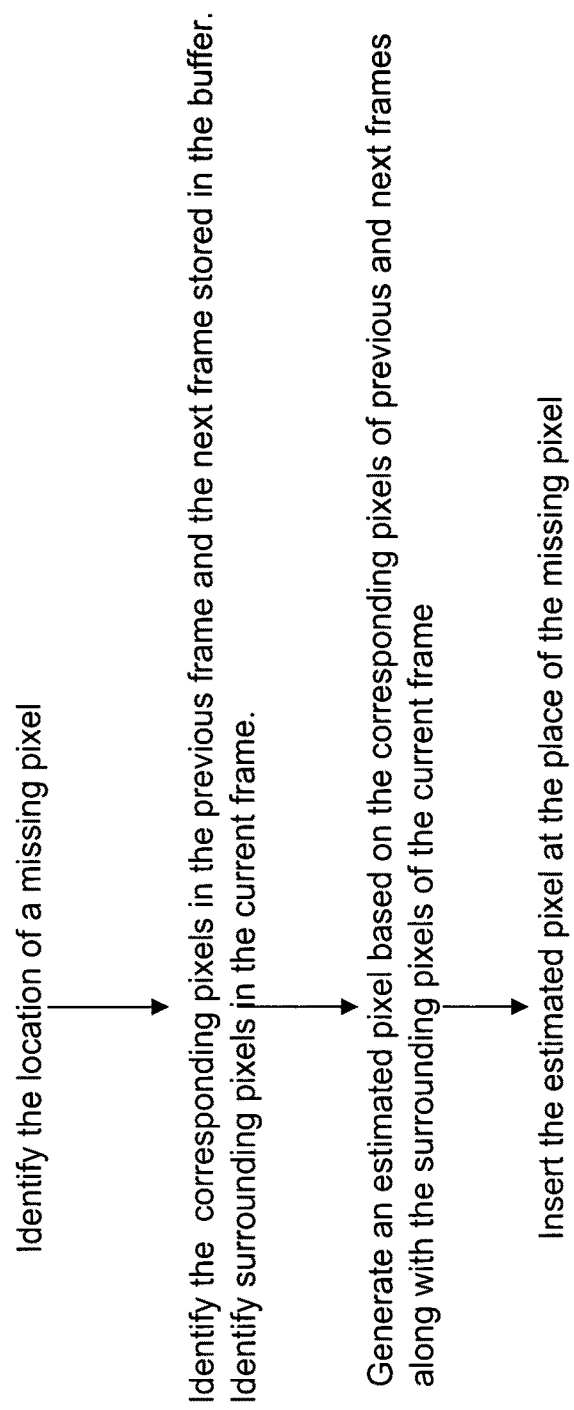
FIG. 25 shows another example of pixel estimation process in the process of packet recovery.
Figure 26:
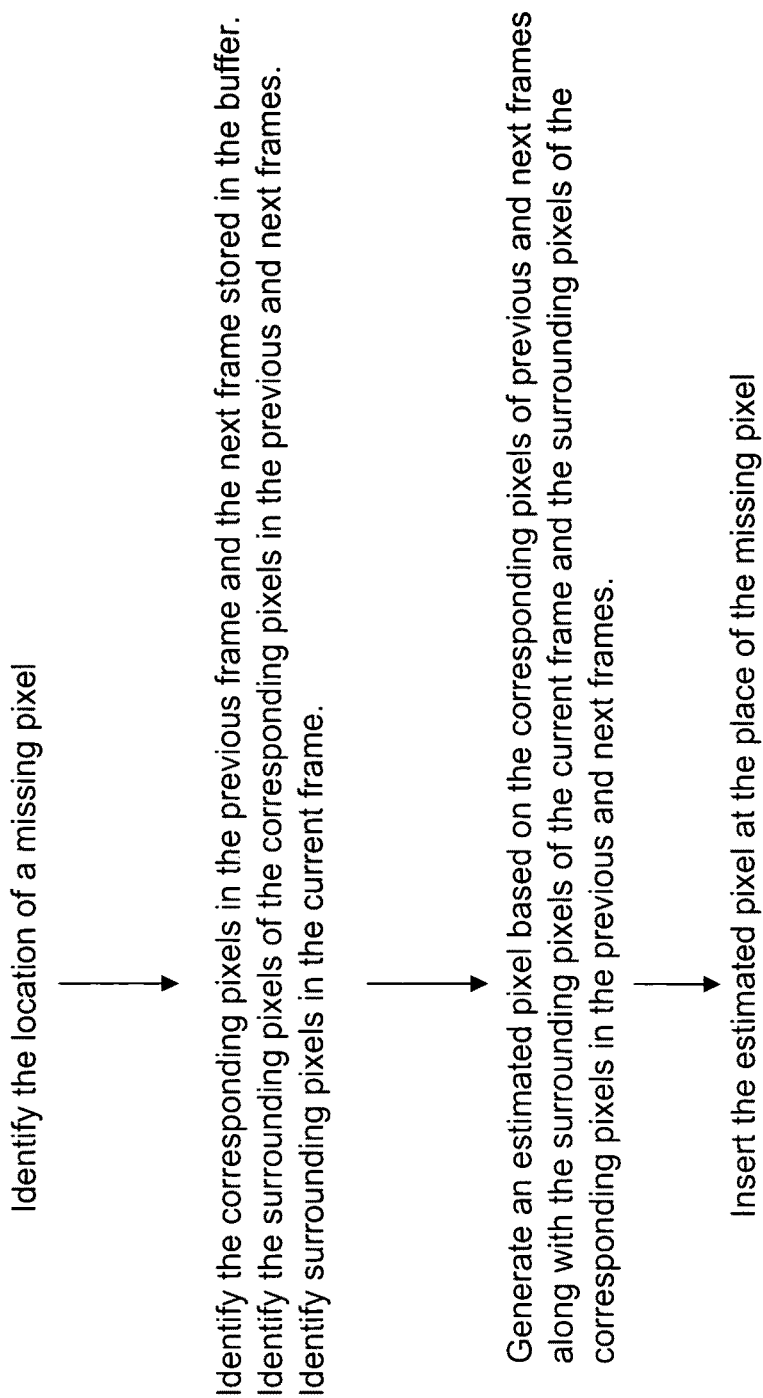
FIG. 26 shows another example of pixel estimation process in the process of packet recovery.

This disclosure provides pixel estimation methods for packet loss recovery during wireless transmission of HD multimedia. The HDMI provides pixel-repetition functionality which repeats each pixel one or multiple times. Copies of each pixel directly follow the original pixel during the transmission at each pixel component channel. FIG. 22 shows a general wireless multimedia transmitting process having a packet loss recovery process, including tagging, compression, transmitting, receiving, decompression, frame storage, detecting packet loss, estimation, and insertion and sending to a sink. During tagging, each packet is tagged with a frame index and a packet index relative to the pixels it contains within the frame before transmitting. Frames are then compressed and transmitted. Received datastreams are decompressed and frame data for past N frames are stored in the memory for backward look-up; current frame is selected with a delay of M frames to allow for N-M frames of forward look-up frame memory.

Thus the received packets are analyzed to find packets that are associated with a particular frame; received packets are also analyzed to detect any missing packets with reference to the packet index. After decoding the received packets, missing packets in a frame are identified; and missing pixel data in a frame is identified using one or a combination of: 1) frame index tags; 2) packet index tags. The relative pixel position of a missing pixel in a frame is then identified.

FIGS. 23-26 show methods of using different reference pixels for the estimation of a missing pixel based on the relative pixel position. The data for the missing pixel is estimated using one or the combinations of:

The pixels surrounding the missing pixel in the frame;

The corresponding pixel in the previous frame(s) (backward look-up);

The corresponding pixel in the next frame(s) (forward look-up);

The pixels surrounding the corresponding pixel in the previous frame(s);

The pixels surrounding the corresponding pixel in the next frame(s).

For a cluster of missing pixels, estimation is done using one or a combination of the following:

Estimating first the outer-most pixel;

Estimating first the pixel that is least missing in a series of frames.

Figure 27:
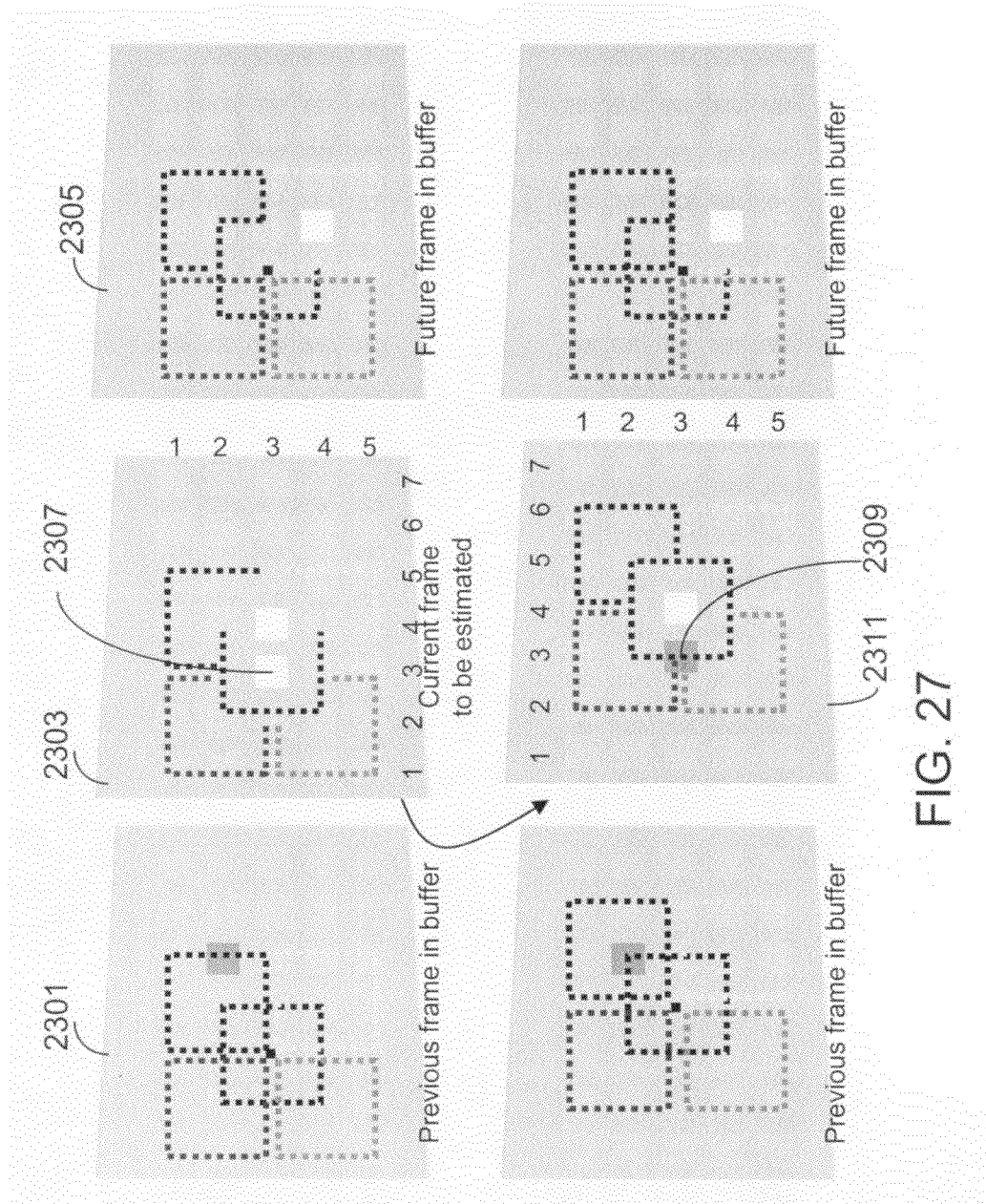
FIG. 27 depicts an example of pixel insertion in the process of packet recovery.

FIG. 27 shows an example of estimation of missing pixel 2307 by doing the following:

1). Estimating pixel 2307 using the data from pixels shown in dotted lines and dots from the current frame 2303 and from the previous frame(s) 2301 and pixels of the future frame(s) 2306 with lost data omitted as inputs in the estimation.

2). Estimating pixel 2307 using the data from pixels shown in dotted lines and dots from the current frame 2303 and from the previous frame(s) 2301 and the future frame(s) 2306.

Estimated pixel value 2309 is inserted into frame 2311 and pixel value 2309 is used for another around of estimation for other pixel losses.

The estimated pixel can be calculated as the result of the following or the combinations of the following:

1) average of backward look-up pixel and forward look-up pixels;

2) average of surrounding pixels in the same frame;

3) average of surrounding pixels in the previous (backward look-up) frame;

4) average of surrounding pixels in the next (forward look-up) frame;

5) average of surrounding pixels in the same frame and/or previous frame, and/or next frame.

And a combination of any or all of the above methods.

Recovery of lost pixel packets includes replacing the pixel of a frame with the corresponding pixel in the previous or next frame; replacing a pixel of a frame with the average of the corresponding pixels from previous and next frame; replacing a pixel of a frame with the average of the pixels surrounding the corresponding pixel from previous frame and the corresponding pixel from the next frame; replacing a pixel of a frame from the average of the pixels surrounding the corresponding pixel from next frame and the corresponding pixel from the previous frame.

And in all of the methods above, the next frame may be replaced by a group of next frames and the previous frames may be a group of previous frames. In the above, "average" may refer to simple average, mean, median, a weighted average, a weighted mean or a weighted median based on a configurable or a pre-set parameter.

For packet insertion, the estimated pixel or a group of pixels are recoded into packets and inserted in the packet stream for further transmission.

For pixel insertion, after the estimated pixel or a group of pixels are inserted into the frame, they are forwarded to the display unit.

In one embodiment, the transmitting processes and interfaces are implemented in a conventional programming language, such as C or C++ or another suitable programming language. In one embodiment of the invention, the program is stored on a computer accessible storage medium at a Picon transmitter which is a part of or attached to a station, for example, devices as shown in FIG. 1. In another embodiment, the program can be stored in other system locations. The storage medium may comprise any of a variety of technologies for storing information. In one embodiment, the storage medium comprises a random access memory (RAM), hard disks, floppy disks, digital video devices, compact discs, video discs, and/or other optical storage mediums, etc.

The processor may have a configuration based on Intel Corporation's family of microprocessors, such as the Pentium family and Microsoft Corporation's Windows operating systems such as Windows 95, Windows 98, Windows 2000 or Windows NT.

In one embodiment, the processor is implemented with a variety of computer platforms using a single chip or multichip microprocessors, digital signal processors, embedded microprocessors, microcontrollers, etc. In another embodiment, the processor is implemented with a wide range of operating systems such as Unix, Linux, Microsoft DOS, Microsoft Windows 2000/9x/ME/XP, Macintosh OS, OS/2 and the like. In another embodiment, the configurable interface can be implemented with embedded software.

In one embodiment of the invention, the program is stored on a computer accessible storage medium at a transmitter which is a part of or attached to a station, for example, a device coordinator or devices as shown in FIG. 1. In another embodiment, the program can be stored in other system locations so long as it can perform the transmitting procedure according to embodiments of the invention. The storage medium may comprise any of a variety of technologies for storing information. In one embodiment, the storage medium comprises a random access memory (RAM), hard disks, floppy disks, digital video devices, compact discs, video discs, and/or other optical storage mediums, etc.

In another embodiment, at least one of the device coordinator and devices comprises a processor configured to or programmed to perform the transmitting procedure. The program may be stored in the processor or a memory of the coordinator and/or the devices. In various embodiments, the processor may have a configuration based on Intel Corporation's family of microprocessors, such as the Pentium family and Microsoft Corporation's Windows operating systems such as Windows 95, Windows 98, Windows 2000 or Windows NT. In one embodiment, the processor is implemented with a variety of computer platforms using a single chip or multichip microprocessors, digital signal processors, embedded microprocessors, microcontrollers, etc. In another embodiment, the processor is implemented with a wide range of operating systems such as Unix, Linux, Microsoft DOS, Microsoft Windows 2000/9x/ME/XP, Macintosh OS, OS/2 and the like. In another embodiment, the transmitting procedure can be implemented with an embedded software. Depending on the embodiments, additional states may be added, others removed, or the order of the states changes.

According to various embodiments, there is provided: a system for wireless media transmission, comprising: a wireless gateway which performs both split-channel data segmentation on a first media stream, and also compression/decompression and/or encryption/de-encryption on a second media stream, to thereby produce multiple channel segments which include compressed signals, and a wireless adapter which receives multiple channel segments which include compressed and uncompressed signals and sorts and reassembles them into a specific formatted media stream; wherein said wireless gateway comprises plurality of data multiplex converters which operate in parallel in splitting said first media datastream into plurality of data channels; wherein said data multiplex converter outputs data packet streams having data packet size per clock that is multiple times of the data packet size per clock of said first media stream; wherein said data multiplex converter outputs data packets having a packet size per clock that is a fraction of that of said first media stream and the output clock rate equals the input clock rate; wherein said data multiplex converter outputs data packets having data blocks not in the same serial order as that of the data blocks of said first media stream; wherein said wireless gateway comprises plurality of radio frequency units which operate in parallel in transmitting data packets generated from said first media stream; wherein at least one of said radio frequency units is IEEE802.11n based; wherein said wireless adapter comprises plurality of data multiplex converters which operate in parallel in reassembling said data packets into one data stream; wherein said wireless adapter comprises plurality of radio frequency units which operate in parallel in receiving data packets generated from said first media stream; wherein at least one of said radio frequency units is 802.11n based.

According to various embodiments, there is provided: a system for wireless media transmission, comprising: a wireless gateway which performs both split-channel data segmentation for a first high definition video data stream, and also compression/decompression and/or encryption/de-encryption on plurality of media streams, to thereby wirelessly produce multiple channels of data packets which include compressed signals, and a wireless adapter which wirelessly receives multiple channels of data packets which include compressed and/or encrypted signals and reassembles them into plurality of formatted media streams; wherein said wireless gateway comprises plurality of data multiplex converters which operate in parallel in producing plurality channels of data packets from said high definition video data stream; wherein at least one said data multiplex converter outputs data packet stream having data packet size per clock that is multiple times of the data packet size per clock of said first media stream; wherein at least one said data multiplex converter outputs data packets having a packet size per clock that is a fraction of that of said first media stream while the output clock rate equals the input clock rate; wherein at least one said data multiplex converter outputs data packets having data blocks not in the same serial order as the data blocks of said first media stream; wherein said wireless gateway comprises plurality of radio frequency units which operate in parallel in transmitting data packets generated from said high definition video data stream; wherein at least one of said radio frequency units is IEEE 802.11n based; wherein said wireless gateway comprises plurality of data packet processing units which operate in parallel in processing data packets generated from said high definition video data stream; wherein said wireless gateway comprises a wireless clock transmitter and clock processing unit to produce a wireless source clock reference of said high definition video data stream; wherein said wireless gateway comprises at lease one processing unit that controls and prioritizes and schedules data packets and allocates transmitting channels dynamically; wherein said wireless gateway comprises at least one transmitting channel for compressed data packets.

According to various embodiments, there is provided: a method for wireless media transmission, comprising actions of: receiving first media stream and second media stream; processing said first media stream using a plurality of processing units in parallel and generating plurality of channels of data packets; compressing and converting said second media stream into data packets; wirelessly transmitting respective channels of data packets; and wirelessly receiving and processing said respective channels of data packets; reassembling related data packets into proper data streams; and sending said processed data streams to a sink; wherein said action of processing said first media stream includes outputting data packet stream having data packet size per clock that is multiple times of the data packet size per clock of said first media stream; wherein said action of processing said first media stream includes outputting data packets having a packet size per clock that is a fraction of that of said first media stream while the output clock rate equals the input clock rate; wherein said action of processing said first media stream includes data packets having data blocks not in the same serial order as the data blocks of said first media stream; wherein said data packets are IP based; wherein said wireless transmitting complies with IEEE 802.11n standards; wherein said first media stream complies with high definition media interface; wherein said second media stream is an analog TV signal; wherein said second media stream is a signal of or a mixture of signals of DDS/CEC, component video, composite video, S-video, Data/VoIP and/or data applications.

Modifications and Variations

As will be recognized by those skilled in the art, the innovative concepts described in the present application can be modified and varied over a tremendous range of applications, and accordingly the scope of patented subject matter is not limited by any of the specific exemplary teachings given. It is intended to embrace all such alternatives, modifications and variations that fall within the spirit and broad scope of the appended claims.

It is contemplated and considered that the implementation of the processing units and transmission of wireless signals comply with any existing standards and protocols. For example, not only the IEEE 802.11n, but also other IEEE 802.11 series; the 2G/3G standards and protocols; Multimedia encoding and decoding comply with HDMI and ISO/IEC MPEG-1 and MPEG-2, MPEG-4 standards, high definition DVD (HD-DVD) standard and multimedia messaging service (MMS standard from 3GPP); the ITU-T H.261/3/4 standards; Audio Video Standard (AVS) in China.

The control system may be designed as a personal device, communicates via the cellular communication system.

For uncompressed and unencrypted data, as shown in FIG. 7, it is optional to have the data be compressed before being processed for transmission. The data may also be directly directed to the processing unit and be processed and transmitted without being compressed.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle.

The claims as filed are intended to be as comprehensive as possible, and NO subject matter is intentionally relinquished, dedicated, or abandoned.

What is claimed is:

1. A system for wireless high-data-rate media transmission, comprising:
    a wireless gateway which both
        a) performs split-channel data segmentation on a first media stream to thereby generate multiple data streams, and also
        b) performs compression-related or encryption-related operations or both on a second media stream,
        and accordingly produces, using said operations a) and b) in combination, a plurality of parallel wireless transmissions which are physically separate, and which can include compressed signals; and
    a wireless adapter which receives the plurality of parallel wireless transmissions, and sorts and reassembles them into a specific formatted media stream;
    wherein said wireless gateway comprises a plurality of data packet processing units which operate in parallel in processing data packets generated from said first media stream;
    wherein said data multiplex converter outputs data packet streams having a data packet size per clock that is a multiple of the data packet size per clock of said first media stream.

2. The system of claim 1, wherein said wireless gateway comprises a plurality of radio frequency units which operate in parallel in transmitting data packets generated from said first media stream.

3. The system of claim 2, wherein at least one of said radio frequency units is IEEE802.11n-based.

4. The system of claim 1, wherein said wireless gateway comprises a wireless clock transmitter and clock processing unit to transmit a source clock reference for said first media stream.

5. The system of claim 1, wherein said wireless gateway comprises at least one processing unit to convert said second media stream into data packets.

6. The system of claim 1, wherein said wireless gateway comprises at least one radio frequency channel assigned for transmitting data packets originated from said second media stream.

7. The system of claim 1, wherein said wireless adapter comprises a plurality of data multiplex converters which operate in parallel in reassembling said data packets into one data stream.

8. The system of claim 1, wherein said wireless adapter comprises a plurality of radio frequency units which operate in parallel in receiving data packets generated from said first media stream.

9. The system of claim 8, wherein at least one of said radio frequency units is IEEE802.11n based.

10. The system of claim 1, wherein said wireless adapter comprises a plurality of data packet processing units which operate in parallel in de-formatting, prioritizing, and scheduling data packets generated from said first media stream.

11. The system of claim 1, wherein said wireless adapter comprises a wireless clock receiver and clock processing unit to replicate the source clock reference of said first media stream.

12. The system of claim 1, wherein said wireless adapter comprises at least one processing unit for processing data packets of said second media stream.

13. The system of claim 1, wherein said wireless adapter comprises at least one radio frequency channel assigned for receiving data packets originated from said second media stream.

14. A system for wireless high-data-rate media transmission, comprising:
    a wireless gateway which both
        a) performs split-channel data segmentation on a first media stream to thereby generate multiple data streams, and also
        b) performs compression-related or encryption-related operations or both on a second media stream,
        and accordingly produces, using said operations a) and b) in combination, a plurality of parallel wireless transmissions which are physically separate, and which can include compressed signals; and
    a wireless adapter which receives the plurality of parallel wireless transmissions, and sorts and reassembles them into a specific formatted media stream;
    wherein said wireless gateway comprises a plurality of data multiplex converters which operate in parallel in splitting said first media datastream into a plurality of data channels;
    wherein said data multiplex converter outputs data packet streams having a data packet size per clock that is a multiple of the data packet size per clock of said first media stream.

15. A system for wireless high-data-rate media transmission, comprising:
    a wireless gateway which both
        a) performs split-channel data segmentation on a first media stream to thereby generate multiple data streams, and also
        b) performs compression-related or encryption-related operations or both on a second media stream,
        and accordingly produces, using said operations a) and b) in combination, a plurality of parallel wireless transmissions which are physically separate, and which can include compressed signals; and a wireless adapter which receives the plurality of parallel wireless transmissions, and sorts and reassembles them into a specific formatted media stream;

wherein said wireless gateway comprises a plurality of data multiplex converters which operate in parallel in splitting said first media datastream into a plurality of data channels;

wherein said data multiplex converter outputs data packets having a packet size per clock that is a fraction of that of said first media stream and the output clock rate equals the input clock rate.

16. A system for wireless high-data-rate media transmission, comprising:

a wireless gateway which both
a) performs split-channel data segmentation on a first media stream to thereby generate multiple data streams, and also
b) performs compression-related or encryption-related operations or both on a second media stream, and accordingly produces, using said operations a) and b) in combination, a plurality of parallel wireless transmissions which are physically separate, and which can include compressed signals; and a wireless adapter which receives the plurality of parallel wireless transmissions, and sorts and reassembles them into a specific formatted media stream;

wherein said wireless gateway comprises a plurality of data multiplex converters which operate in parallel in splitting said first media datastream into a plurality of data channels;

wherein said data multiplex converter outputs data packets having data blocks in different serial order than that of the data blocks of said first media stream;

wherein said data multiplex converter outputs data packets having a packet size per clock that is a fraction of that of said first media stream and the output clock rate equals the input clock rate.

* * * * *